United States Patent
Usami

(10) Patent No.: US 9,647,534 B2
(45) Date of Patent: May 9, 2017

(54) POWER CONVERSION APPARATUS

(71) Applicant: TOSHIBA TEC KABUSHIKI KAISHA, Shinagawa-ku, Tokyo (JP)

(72) Inventor: Yutaka Usami, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 14/682,237

(22) Filed: Apr. 9, 2015

(65) Prior Publication Data

US 2015/0326128 A1 Nov. 12, 2015

(30) Foreign Application Priority Data

May 9, 2014 (JP) ................. 2014-098072

(51) Int. Cl.
H02M 5/42 (2006.01)
H02M 1/42 (2007.01)
H02M 3/335 (2006.01)
H02M 1/00 (2006.01)

(52) U.S. Cl.
CPC ..... *H02M 1/4258* (2013.01); *H02M 3/33507* (2013.01); *H02M 2001/0003* (2013.01); *Y02B 70/126* (2013.01)

(58) Field of Classification Search
CPC .... H02J 4/00; H02M 1/4258; H02M 3/33569; H02M 7/797; H02M 2001/009; Y02B 70/126; Y10T 307/658
USPC ............ 363/16–20, 21.08, 21.12; 307/72–75
See application file for complete search history.

(56) References Cited

U.S. PATENT DOCUMENTS

| | | | | |
|---|---|---|---|---|
| 6,151,231 | A * | 11/2000 | Saint-Pierre | H02M 3/33569 363/17 |
| 6,344,979 | B1 * | 2/2002 | Huang | H02M 3/337 363/131 |
| 7,136,294 | B2 * | 11/2006 | Phadke | H02M 1/34 363/132 |
| 7,170,761 | B2 * | 1/2007 | Yasumura | H02M 1/4241 363/17 |
| 8,693,213 | B2 * | 4/2014 | Jungreis | H02M 1/4241 363/17 |
| 8,780,588 | B2 * | 7/2014 | Teraura | H02M 3/33584 363/127 |
| 9,276,496 | B2 * | 3/2016 | Murakami | H02M 7/49 |

FOREIGN PATENT DOCUMENTS

| | | |
|---|---|---|
| JP | 2014-007879 | 1/2014 |
| JP | 2014-039418 | 2/2014 |

* cited by examiner

*Primary Examiner* — Rajnikant Patel
(74) *Attorney, Agent, or Firm* — Amin, Turocy & Watson LLP

(57) ABSTRACT

A power conversion apparatus is constituted by a power conversion circuit and a control section. The control section causes a gate driving signal to alternately open and close a set of a first switch and a fourth switch, and a set of a second switch and a third switch based on a circuit current flowing through the power conversion circuit and a voltage of an AC power supply. A current in which a high frequency component is mixed into a low frequency component of the AC power supply flows through the power conversion apparatus by the opening and closing the sets of the switches.

5 Claims, 22 Drawing Sheets

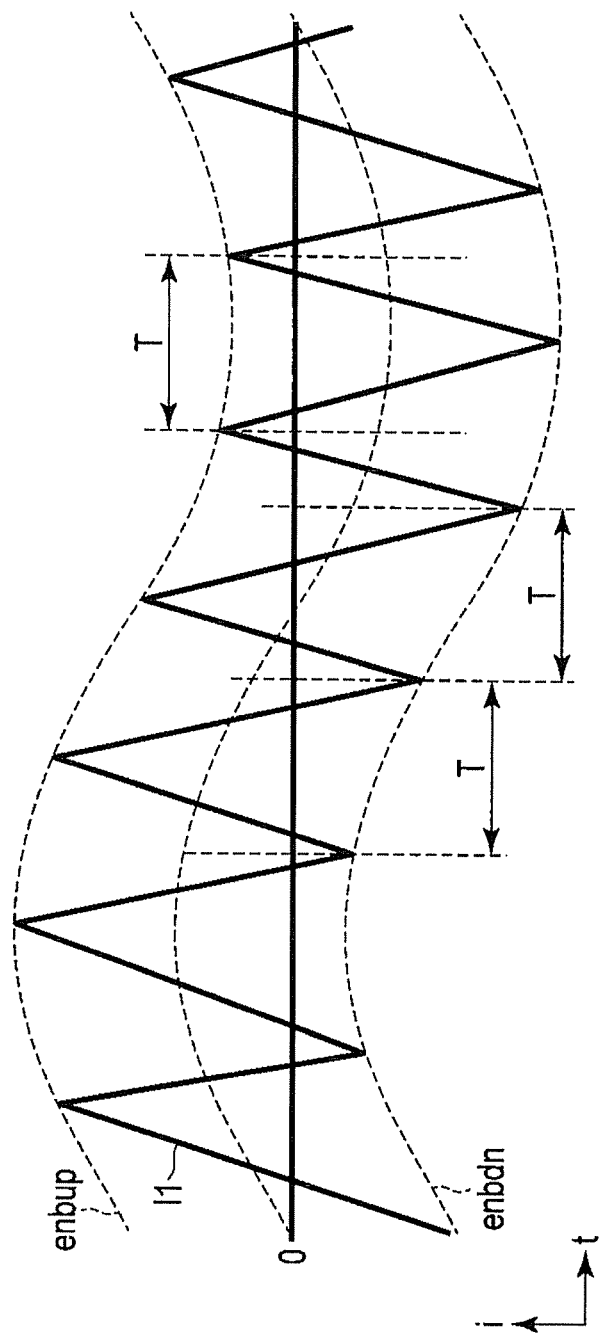

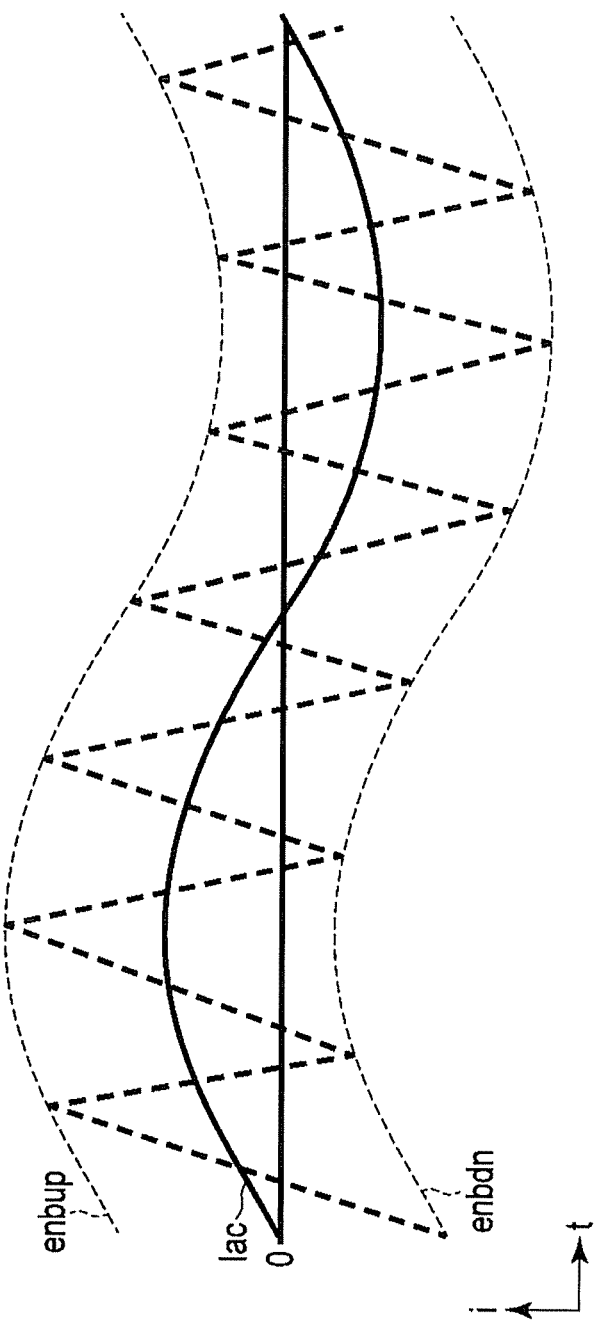

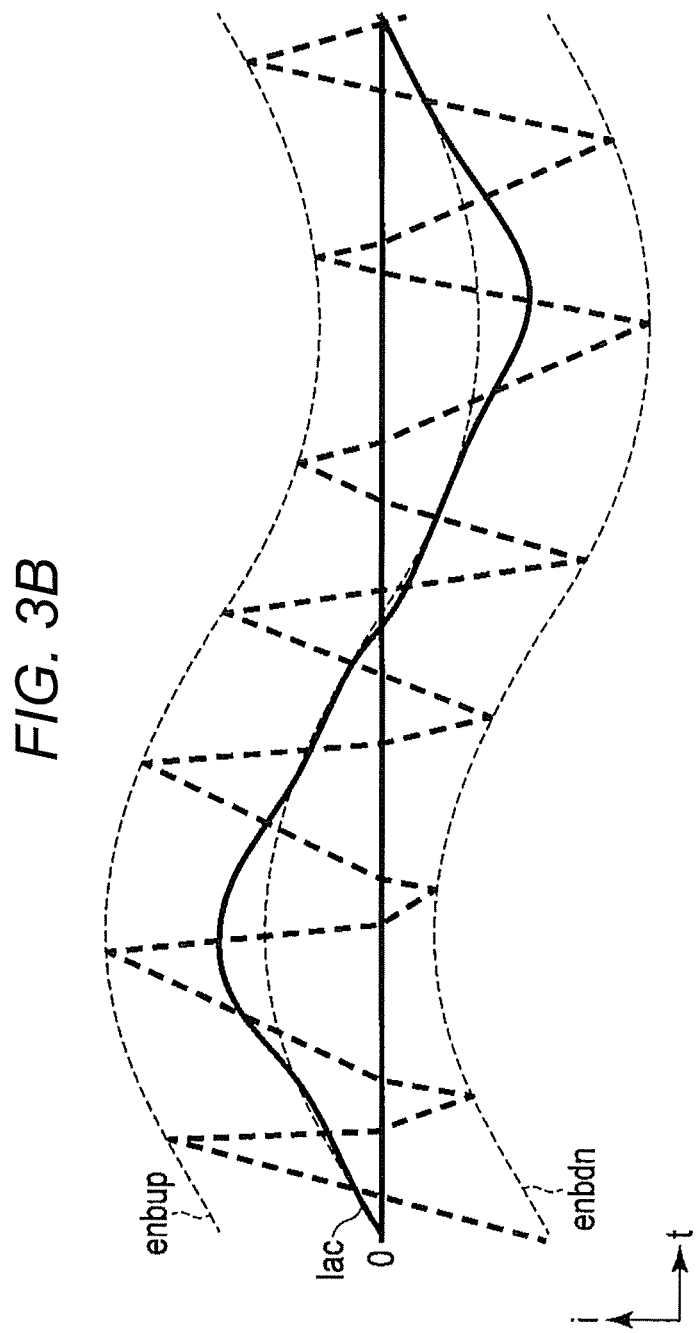

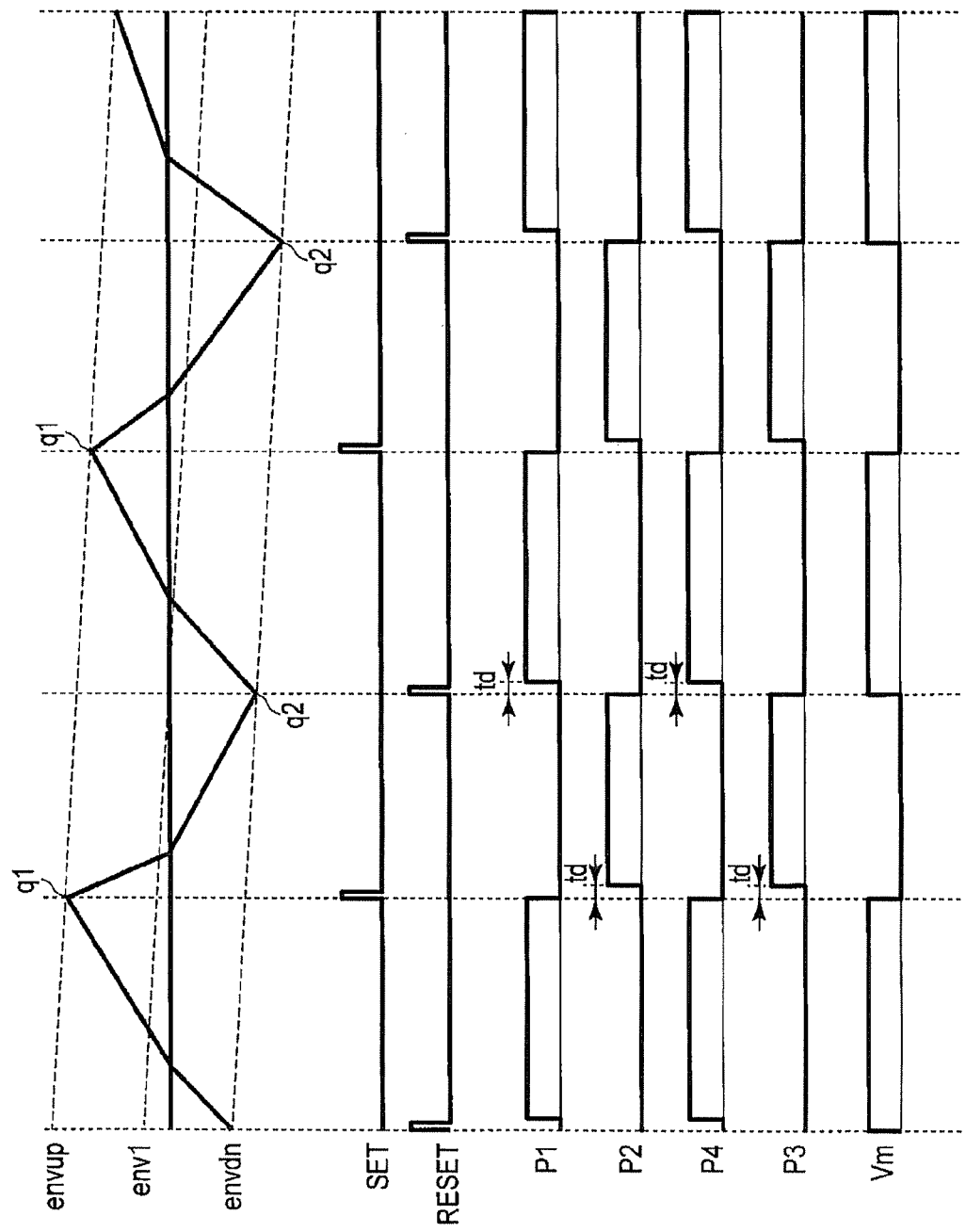

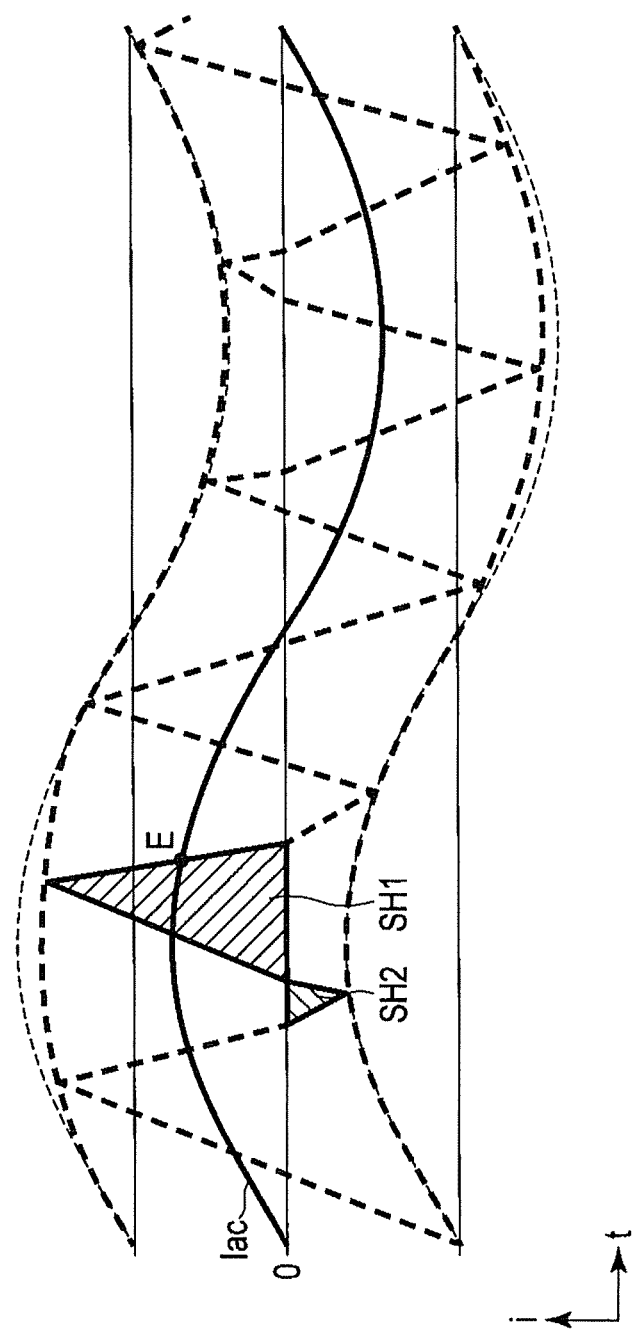

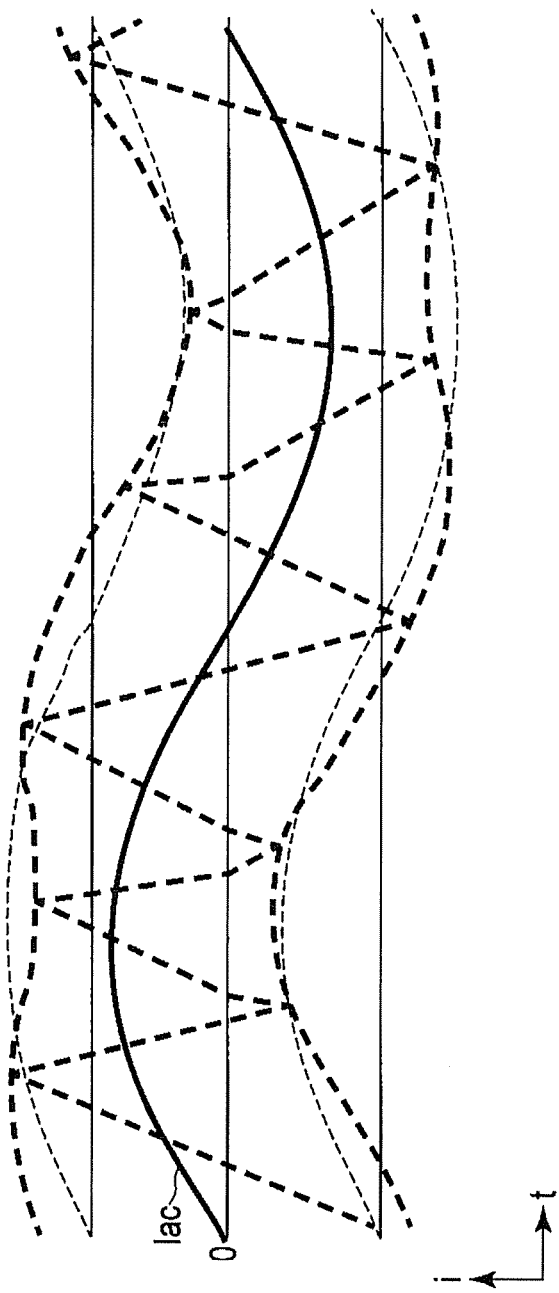

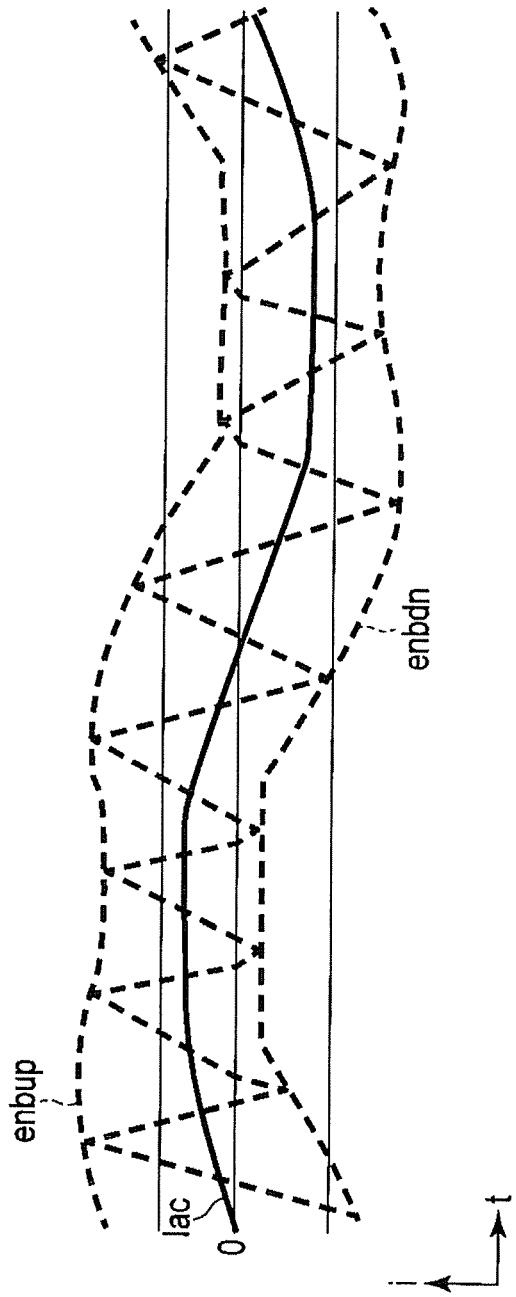

… (US 9,647,534 B2)

POWER CONVERSION APPARATUS

CROSS-REFERENCE TO RELATED APPLICATION

This application is based upon and claims the benefit of priority from Japanese Patent Application No. 2014-098072, filed May 9, 2014, the entire contents of which are incorporated herein by reference.

FIELD

Embodiments described herein relate generally to a power conversion apparatus that supplies power to a load by converting an AC voltage obtained from an AC power supply into a DC voltage.

BACKGROUND

As a method for converting an AC voltage into a DC voltage, the following two methods are generally known. A first method uses a diode bridge circuit and a smoothing capacitor. The diode bridge circuit rectifies full waves of the AC from the AC power supply. The smoothing capacitor smoothes the DC after the full-wave rectification is performed.

In the first method, in either case of the AC voltage is positive or negative, a current always flows through a series circuit of two diodes. At this time, in the two diodes, a power loss corresponding to a product of the current flowing through each diode and a forward voltage of the diode occurs.

In a second method, a power factor improving converter (PFC) is interposed between the diode bridge circuit and the smoothing capacitor of the first method. The power factor improving converter controls the current flowing through the AC power supply to be sinusoidal and controls the current to be equal to a voltage phase of the AC power supply.

Also, in the second method, since the current flows through the series circuit of two diodes when performing the full-wave rectification, the power loss is generated. In addition, since the current alternately flows through a field effect transistor (FET) and the diodes configuring the power factor improving converter, further loss occurs.

Furthermore, in the power factor improving converter, an output voltage has set to be higher than an input voltage from necessity to make a waveform of an input current be a sine wave. However, a required voltage at the load is not always higher than the input voltage. In this case, a step-down converter is connected to a subsequent stage of the power factor improving converter. Then, the voltage boosted by the power factor improving converter steps down to a desired voltage. The loss also occurs during the step down. An entirety of the power conversion apparatus is constituted by three stages of an AC-DC conversion, a DC-DC (boost) conversion, and a DC-DC (step down) conversion, and power conversion efficiency appears as a product of conversion efficiencies thereof. For example, if the efficiency for one stage is 0.95, the efficiency becomes 0.95×0.95×0.95=0.86 in the three stages. That is, although excellent conversion having the efficiency of 95%, the efficiency falls to 86% in continuous three stages. As described above, even if individual conversion efficiency is good, the conversion efficiency is significantly reduced by multiple stages.

Recently, a demand for saving electric power of an electronic apparatus is increased and it is also an essential condition that current harmonic noise is not emitted so as not to adversely affect on an external environment. Thus, it is required to achieve both improvement of the conversion efficiency of the power conversion apparatus that supplies power to the load and a suppression function of a current harmonic.

JP-A-2011-147277 is an example of the related art.

DESCRIPTION OF THE DRAWINGS

FIGS. 2A and 2B are waveform diagrams illustrating a basic circuit operation of the power conversion apparatus.

FIGS. 3A and 3B are waveform diagrams illustrating an example of a circuit operation if a load is applied to the power conversion apparatus.

FIG. 8 is a waveform diagram illustrating a main circuit operation of the control section.

FIGS. 10A and 10B are waveform diagrams illustrating a circuit current and an input current when operating a part of the control section.

FIGS. 11A and 11B are waveform diagrams illustrating a circuit current and an input current when operating all of the control section.

FIGS. 16A and 16B are waveform diagrams illustrating a circuit current and an input current when operating ZVS compensation of the second embodiment.

DETAILED DESCRIPTION

An object of exemplary embodiments is to achieve both improvement of conversion efficiency of a power conversion apparatus that supplies power to a load and a suppression function of current harmonic.

In one embodiment, a power conversion apparatus includes a power conversion circuit and a control unit. The power conversion circuit forms a closed loop by connecting a first inductor and a first capacitor to both ends of an AC power supply in series. The power conversion circuit forms a closed loop by connecting a first switch and a second switch in series, connecting a third switch and a fourth switch in series, and respectively connecting the first switch and the third switch, and the second switch and the fourth switch. The power conversion circuit connects a series circuit consisting of the first capacitor, a second inductor, and a primary winding of a transformer between a connection point of the first switch and the second switch, and a connection point of the third switch and the fourth switch. Furthermore, the power conversion circuit connects a second capacitor between a connection point of the first switch and the third switch, and a connection point of the second switch and the fourth switch. Then, the power conversion circuit includes a rectification smoothing circuit in a secondary winding of the transformer and connects a load to an output of the rectification smoothing circuit. The control unit supplies a gate driving signal for alternately opening and closing a set of the first switch and the fourth switch, and a set of the second switch and the third switch to a set of the first switch and the fourth switch, and a set of the second switch and the third switch such that a current in which a high frequency component is mixed into a low frequency component of the AC power supply flows through the power conversion circuit and a frequency of the high frequency component is modulated in synchronization with a phase of the low frequency component of the AC power supply based on a power supply voltage that is obtained by a detection unit configured to detect the voltage of the AC power supply, a circuit current that is obtained by a detection unit configured to detect the circuit current flowing through the power conversion circuit, and a capacitor voltage obtained by a detection unit configured to detect a voltage of the second capacitor.

Hereinafter, an embodiment of a power conversion apparatus will be described with reference to the drawings.

First Embodiment

Figure 1:
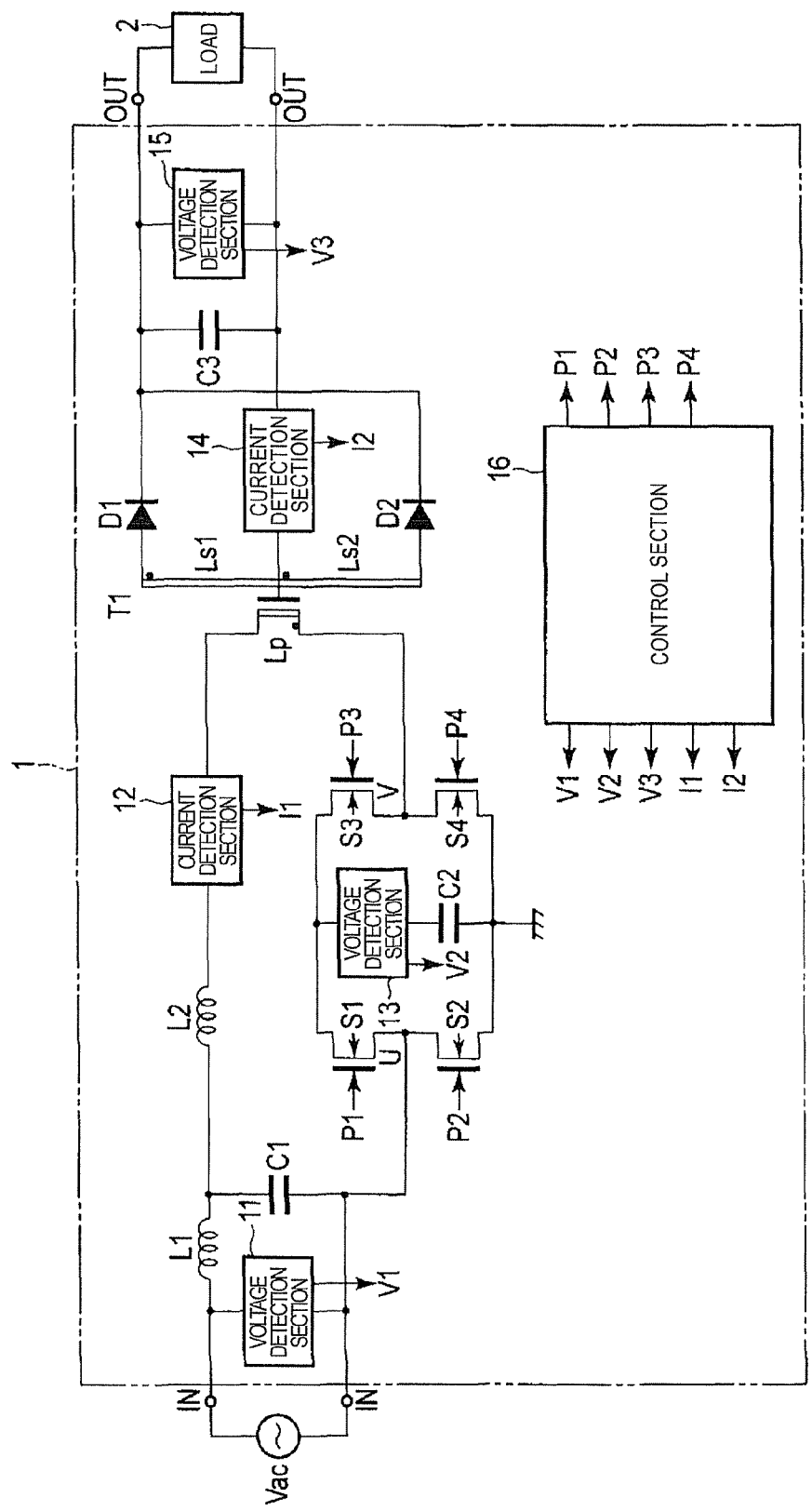
FIG. 1 is a circuit diagram illustrating an entire configuration of a power conversion apparatus.

FIG. 1 is a circuit configuration view of a power conversion apparatus 1 of a first embodiment.

The power conversion apparatus 1 includes first to fourth semiconductor switches (hereinafter, simply referred to as switch) S1, S2, S3, and S4, first and second inductors L1 and L2, and first to third capacitors C1, C2, and C3, a transformer T1, and first and second diodes D1 and D2. All the switches S1 to S4 use an N-type field effect FET or a GaN, SiC element having the same characteristics, and the like. The power conversion apparatus 1 connects a commercial AC power supply (hereinafter, simply referred to as AC power supply) Vac to an input terminal IN and connects a load 2 to an output terminal OUT.

The power conversion apparatus 1 connects the first to fourth four semiconductor switches S1, S2, S3, and S4 by a so-called a bridge method. That is, a drain terminal of the first switch S1 is connected to a drain terminal of the third switch S3. A source terminal of the first switch S1 is connected to a drain terminal of the second switch S2. A source terminal of the third switch S3 is connected to a drain terminal of the fourth switch S4. A source terminal of the second switch S2 is connected to a source terminal of the fourth switch S4.

Here, in the embodiment, for the sake of convenience of the description, a node name of a connection point of the source terminal of the first switch S1 and the drain terminal of the second switch S2 is referred to as a U terminal. A node name of a connection point of the source terminal of the third switch S3 and the drain terminal of the fourth switch S4 is referred to as a V terminal.

The power conversion apparatus 1 forms a closed loop by connecting the first inductor L1 and the first capacitor C1 to the input terminal IN in series through the AC power supply Vac. Furthermore, the power conversion apparatus 1 forms a closed loop by connecting the first capacitor C1, the second inductor L2, and a primary winding Lp of the transformer T1 in series between the U terminal and the V terminal. Furthermore, the power conversion apparatus 1 connects the second capacitor C2 between a connection point of the drain terminal of the first switch S1 and the drain terminal of the third switch S3, and a connection point of the source terminal of the second switch S2 and the source terminal of the fourth switch S4.

The power conversion apparatus 1 connects two secondary windings Ls1 and Ls2 of the transformer T1 in series. The power conversion apparatus 1 connects an anode terminal of the first diode D1 to one end (secondary winding Ls1 side) of the secondary windings Ls1 and Ls2 connected in series and connects an anode terminal of the second diode D2 to the other end (secondary winding Ls2 side). The power conversion apparatus 1 connects a cathode terminal of the first diode D1 to a cathode terminal of the second diode D2. Furthermore, the power conversion apparatus 1 connects the third capacitor C3 between a center point at which the secondary winding Ls1 and the secondary winding Ls2 are connected in series, and a connection point between cathode terminals of the first and second diodes D1 and D2. Here, the first and second diodes D1 and D2, and the third capacitor C3 configures a rectification smoothing circuit. In the power conversion apparatus 1, both terminals of the third capacitor C3 that is an output terminal of the rectification smoothing circuit are output terminals OUT.

The power conversion apparatus 1 includes voltage detection sections 11, 13, and 15, and current detection sections 12 and 14. Specifically, the power conversion apparatus 1 connects the voltage detection section 11 between the input terminals IN. The voltage detection section 11 detects an input voltage applied between the input terminals IN from the AC power supply Vac and outputs a detection signal V1.

The power conversion apparatus 1 connects the current detection section 12 between the second inductor L2 and the primary winding Lp of the transformer T1. The current detection section 12 detects the circuit current flowing through the second inductor L2 and outputs a detection signal I1.

The power conversion apparatus 1 connects the voltage detection section 13 between the connection point of the drain terminal of the first switch S1 and the drain terminal of the third switch S3, and the second capacitor C2. The voltage detection section 13 detects a voltage (hereinafter, referred to as C2 voltage) of the second capacitor C2 and outputs a detection signal V2.

The power conversion apparatus 1 connects the current detection section 14 between a center point of the secondary winding Ls1 and the secondary winding Ls2, and the third capacitor C3. The current detection section 14 detects a current (hereinafter, referred to as diode current) flowing through the first and second diodes D1 and D2, and outputs a current signal I2.

The power conversion apparatus 1 connects the voltage detection section 15 between both terminals of the third capacitor C3. The voltage detection section 15 detects an output voltage generated between the output terminals OUT and outputs a detection signal V3.

The power conversion apparatus 1 includes a control section 16. The control section 16 inputs detection signals V1, V2, V3, I1, and I2 respectively output from the voltage, detection sections 11, 13, and 15, and the current detection sections 12 and 14. Then, the control section 16 outputs gate driving signals P1, P2, P3, and P4 applied to each gate terminal of the switches S1 to S4 configuring the bridge based on the input signals.

If the switch S1 and the switch S4 are simultaneously turned on, and the switch S2 and the switch S3 are simultaneously turned off by the gate driving signals P1, P2, P3, and P4, a closed loop of a positive electrode of the second capacitor C2, the switch S1, the first capacitor C1, the second inductor L2, the primary winding Lp of the transformer T1, the switch S4, and a negative electrode of the second capacitor C2 is formed in the power conversion apparatus 1. Then, a current flows through the closed loop based on electric charge (voltage) charged to the second capacitor C2. At this time, some of energy applied to the transformer T1 is transmitted to the secondary windings Ls1 and Ls2 side, is rectified by the diodes D1 and D2, and is charged to the third capacitor C3 as the electric charge.

Conversely, if the switch S1 and the switch S4 are simultaneously turned off, and the switch S2 and the switch S3 are simultaneously turned on, now, a closed loop of the positive electrode of the second capacitor C2, the switch S3, the primary winding Lp of the transformer T1, the second inductor L2, the first capacitor C1, the switch S2, and the negative electrode of the second capacitor C2 is formed. As a result, a voltage in the opposite direction is applied to the primary winding Lp of the transformer T1. Some of energy applied to the transformer T1 is output to the secondary windings Ls1 and Ls2 side by applying the voltage of the opposite direction, is rectified by the diodes D1 and D2, and is charged to the third capacitor C3 as the electric charge.

In the above description, driving of the switches S1, S2, S3, and S4 is performed by a high frequency approximately 100 kHz. The first capacitor C1 is a capacity to sufficiently pass the circuit current through the high frequency of 100 kHz and, on the other hand, is a capacity to block the circuit current to a low frequency of 50 Hz of the AC power supply Vac. That is, the power conversion apparatus 1 configures a low-pass filter by the first inductor L1 and the first capacitor C1. A high frequency component of 100 kHz of the circuit current passes the loop through the first capacitor C1 by the low-pass filter. The low frequency component of 50 Hz passes the loop leading to the AC power supply Vac through the first inductor L1.

The low frequency component of 50 Hz and the high frequency component of 100 kHz are mixed in the circuit current. Specifically, a sinusoidal current of 50 Hz in synchronization with the voltage phase of the AC power supply Vac of 50 Hz and the high frequency current of 100 kHz transmitted to the secondary side through the transformer T1 are mixed. The circuit current can be simultaneously controlled by appropriately changing ON and OFF timing and the frequency of the four switches S1 to S4 depending on the voltage phase of the AC power supply Vac. A situation of the circuit current can be detected by the current detection section 12.

The current of the circuit current in which the high frequency component and the low frequency component are mixed, which flows through the AC power supply Vac, is only the low frequency component. That is, the sinusoidal current in synchronization with the voltage phase of the AC power supply Vac can flow through the AC power supply Vac. Furthermore, the high frequency component is transmitted to the secondary side in the transformer T1. That is, the power conversion apparatus 1 realizes a function as an insulating converter.

As described above, the power conversion apparatus 1 can make the current flowing through the AC power supply Vac be a current that does not contain a component other than 50 Hz, that is, has a small input current harmonic. Furthermore, the power conversion apparatus 1 generates a current phase in synchronization with the voltage phase of the AC power supply Vac. Thus, the power conversion apparatus 1 performs a circuit operation having a high power factor. That is, the circuit of the power conversion apparatus 1 realizes a function equivalent to a Phase Factor Controller (PFC: power factor improvement and a current harmonic reduction circuit).

Next, a basic principle of the control section 16 will be described with reference to waveform diagrams of FIGS. 2A and 2B. FIGS. 2A and 2B illustrate the same waveform. In the waveform, a horizontal axis indicates a time t and a vertical axis indicates a current value i. The time t indicates one cycle of the commercial power supply Vac of 50 Hz.

A waveform indicated in a solid line in FIG. 2A is a waveform indicating the detection signal I1 of the circuit current. However, the detection signal I1 is the high frequency of 100 kHz, but it is difficult to understand the high frequency because the frequency is too different if the frequency is accurately described. Thus, in order to easily illustrate the view, the component of 100 kHz is coarsely illustrated.

Envelopes enbup and enbdn having a predetermined width based on a sine wave equivalent to the voltage phase of the AC power supply Vac are considered. In this case, the control section 16 repeats the following operations of A and B.

A. If the detection signal I1 reaches one envelope, for example, the envelope enbup, a direction of the current is reversed by reversing ON and OFF of the switches S1, S2, S3, and S4 configuring the bridge.

B. If the detection signal I1 reaches the other envelope, for example, the envelope enbdn, the direction of the current is reversed by reversing ON and OFF of the switches S1, S2, S3, and S4 again.

Here, if it is assumed that the detection signal I1 is substantially linearly increased and decreased by a reactor action of the second inductor L2, a position where a current peak becomes half is an average current. That is, as indicated in a solid line of FIG. 2B, a waveform of a current signal Iac going out to the AC power supply Vac side through the low-pass filter is approximately a waveform of a center point sandwiched between two envelopes enbup and enbdn.

Furthermore, if it is assumed that a distance between two envelopes enbup and enbdn is always constant, times T required for the current to reciprocate are substantially the same as each other. Thus, there is no change in the frequency at any phase regardless of the voltage phase of the AC power supply Vac. That is, the frequency is constant.

However, in the description of FIGS. 2A and 2B, it is assumed that the detection signal I1 of the circuit current substantially linearly flows. If the load 2 is a light load, there is no problem. However, if the load 2 is a heavy load, the detection signal I1 is not a straight line. If the detection signal I1 is not the straight line, the control concept described above is no longer applied. The situation will be described with reference to waveform diagrams of FIGS. 3A and 3B.

Figure 3A:
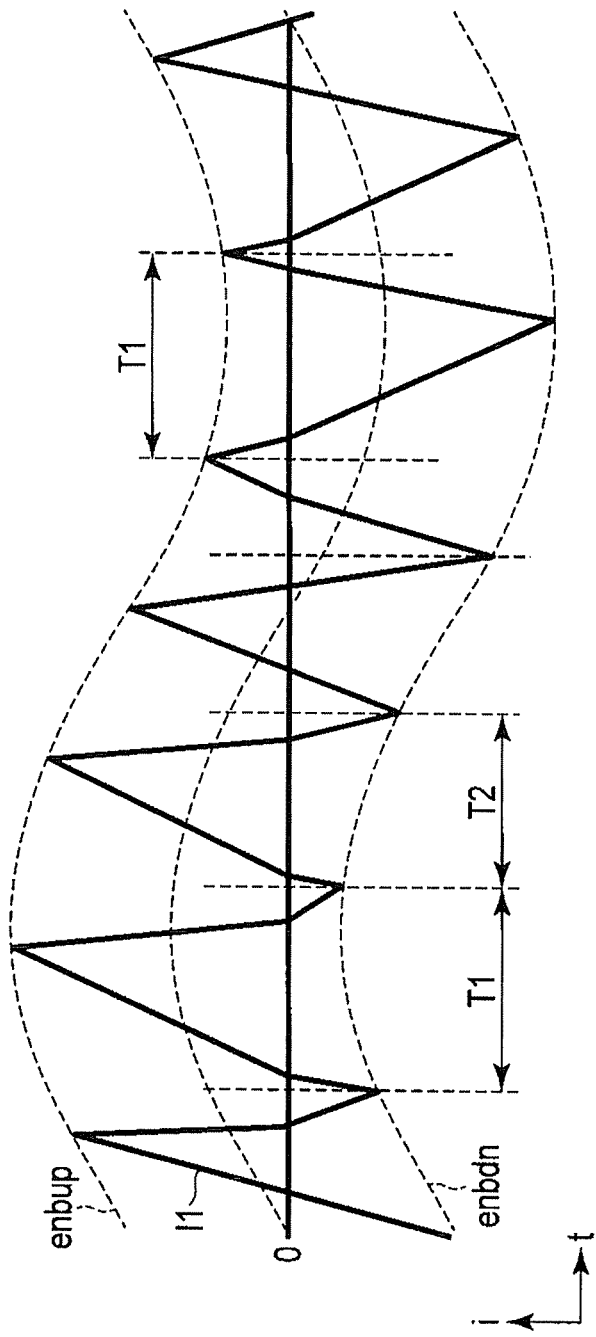

FIGS. 3A and 3B illustrate the same waveforms as those of FIGS. 2A and 2B, a horizontal axis indicates the time t, and a vertical axis indicates the current value i. However, in the detection signal I1 of the circuit current reciprocating between two envelopes enbup and enbdn, a slope is changed about a point (hereinafter, referred to as a current zero point "0") in which a current value i becomes zero. Furthermore, a change of the slope is not uniform. The slope is large in the vicinity of a voltage peak of the AC power supply Vac and the slope is small in the vicinity of a voltage zero cross. The change of the slopes is generated at timing when the current flows through the secondary windings Ls1 and Ls2 of the transformer T1. Strictly speaking, although the slope of the current is not always changed at a current zero point 0, in order to simplify the description, it is assumed that the slope is changed at all current zero points 0.

The control section 16 also performs a folding operation with respect to the detection signal I1 of the circuit current in which the slope is changed in the middle thereof by the sine wave envelopes enbup and enbdn. As indicated in a solid line of FIG. 3B, the current signal Iac flowing through the AC power supply Vac is deviated from a desired sine wave and becomes a signal of a waveform that is protruded in the vicinity of the voltage peak by performing the folding operation of the detection signal I1 by the envelopes enbup and enbdn.

The reason is as follows. That is, since the slope of the current is idle in the vicinity of the voltage peak of the AC power supply Vac, it takes time to reach the envelope enbup. Thus, a frequency T1 of this interval is reduced. If the frequency T1 is reduced, energy transmitted to the secondary windings Ls1 and Ls2 through the transformer T1 is temporarily increased. Meanwhile, the slope of the current is substantially linear in the vicinity of the voltage zero cross of the AC power supply Vac without change. Thus, a frequency T2 is not reduced. As described above, if the load 2 is the heavy load, frequency fluctuation occurs in an oscillation operation of 100 kHz in one cycle of 50 Hz. The detection signal I1 of the circuit current does not become a desired sinusoidal shape due to influence of the fluctuation.

Next, a control method in which power supply to the load 2 is not disturbed while maintaining the waveform of the current signal Iac to the sine wave with respect to the detection signal I1 of the circuit current that is affected by such a load will be described with reference to FIGS. 4 to 7.

Figure 4:
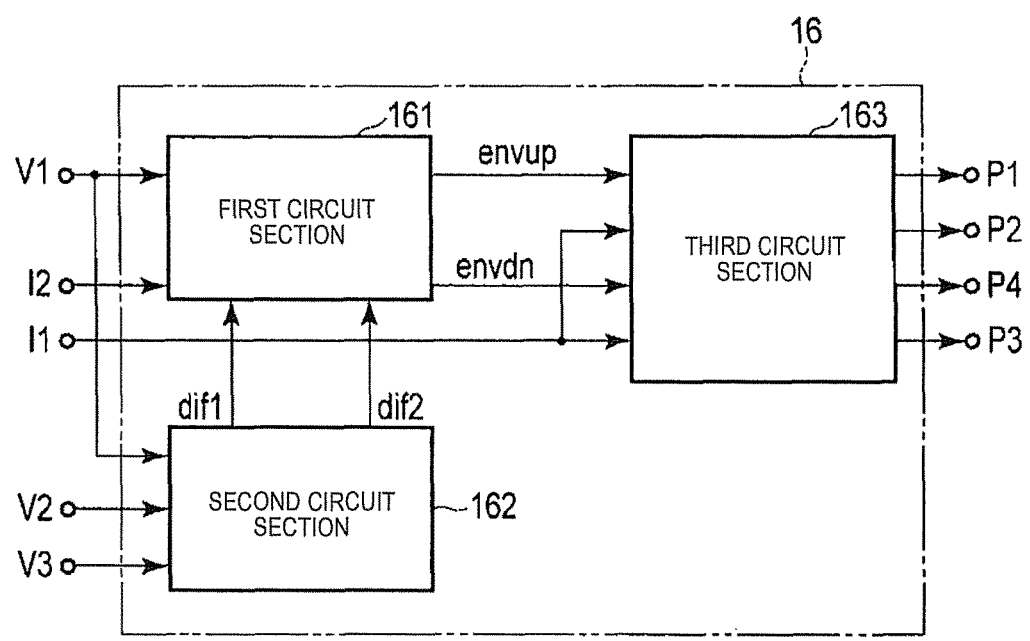
FIG. 4 is a block diagram illustrating a schematic configuration of a control section in the power conversion apparatus.

FIG. 4 is a block diagram illustrating a schematic configuration of the control section 16 of FIG. 1. The control section 16 consists of a first circuit section 161, a second circuit section 162, and a third circuit section 163. The detection signal V1 of the circuit voltage and the detection signal I2 of the diode current are input into the first circuit section 161 and the positive envelope signal envup and the negative envelope signal envdn are output from the first circuit section 161. The positive envelope signal envup and the negative envelope signal envdn are output to the third circuit section 163.

The detection signal V1 of the circuit voltage, the detection signal V2 of the C2 voltage, and the detection signal V3 of the output voltage are input into the second circuit section 162, and an amplification factor feedback signal dif1 and a width feedback signal dif2 are output from the second circuit section 162. The amplification factor feedback signal dif1 and the width feedback signal dif2 are output to the first circuit section 161.

The positive envelope signal envup, the negative envelope signal envdn, and the detection signal I1 of the circuit current are input into the third circuit section 163, and the gate driving signals P1, P2, P3, and 24 of the switches S1, S2, S3, and S4 respectively configuring the bridge are output from the third circuit section 163. The gate driving signals P1, P2, P3, and P4 output to gate terminals of the switches S1, S2, S3, and S4, respectively.

Figure 5:
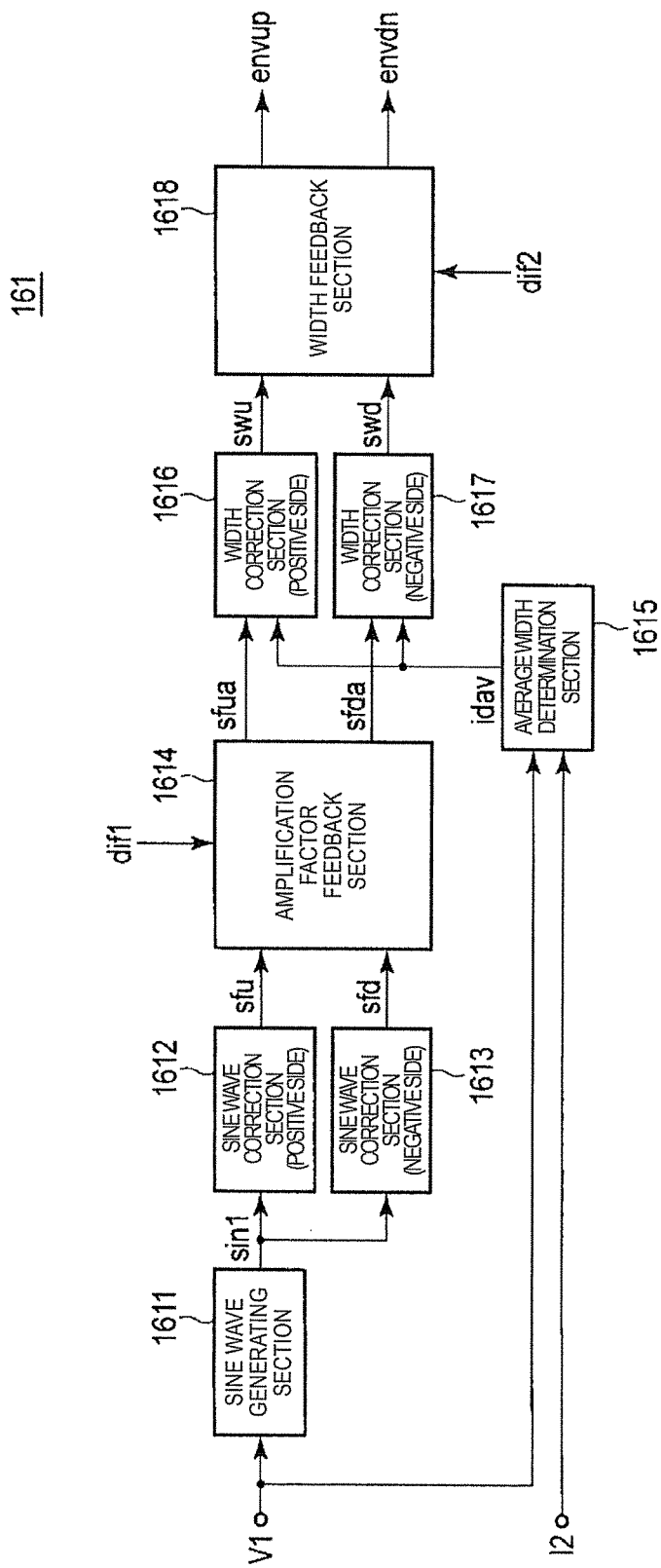
FIG. 5 is a block diagram illustrating an internal configuration of a first circuit section of FIG. 4.

FIG. 5 is a block diagram illustrating an internal configuration of the first circuit section 161. As illustrated in FIG. 5, the first circuit section 161 includes a sine wave generation section 1611, a positive-side sine wave correction section 1612, a negative-side sine wave correction section 1613, an amplification factor feedback section 1614, an average width determination section 1615, a positive-side width correction section 1616, a negative-side width correction section 1617, and a width feedback section 1618.

The detection signal V1 is input into the sine wave generation section 1611. The detection signal V1 indicates the voltage and the phase of the AC power supply Vac. The sine wave generation section 1611 detects the frequency and the phase of the AC power supply Vac based on the detection signal V1 and outputs a sine wave signal sin 1 having the same phase as that of the AC power supply Vac. The sine wave signal sin 1 is output to the positive-side and negative-side sine wave correction sections 1612 and 1613.

The sine wave signal sin 1 is input into the positive-side sine wave correction section 1612. The sine wave correction section 1612 performs a predetermined function calculation to the sine wave signal sin 1 and corrects the sine wave signal sin 1. A sine wave signal sfu after the correction is output to the amplification factor feedback section 1614. Similarly, the sine wave signal sin 1 is input into the negative-side sine wave correction section 1613. The sine wave correction section 1613 performs a predetermined function calculation to the sine wave signal sin 1 and corrects the sine wave signal sin 1. A sine wave signal sfd after the correction is output to the amplification factor feedback section 1614. The function calculation will be described below.

The positive-side sine wave signal sfu corrected by the positive-side sine wave correction section 1612 and the negative-side sine wave signal sfd corrected by the negative-side sine wave correction section 1613 are input into the amplification factor feedback section 1614. The amplification factor feedback section 1614 multiplies the sine wave signals sfu and sfd by a predetermined amplification factor specified by the amplification factor feedback signal dif1 respectively and outputs a result thereof as a positive-side sine wave signal sfua and a negative-side sine wave signal sfud. The positive-side sine wave signal sfua is output to the positive-side width correction section 1616. The negative-side sine wave signal sfud is output to the negative-side width correction section 1617. A generation method of the amplification factor feedback signal dif1 will be described later.

The detection signal V1 and the detection signal I2 are input into the average width determination section 1615. The detection signal I2 indicates a secondary-side diode current of the transformer T1. The average width determination section 1615 averages signal values of the detection signal I2. The average width determination section 1615 averages the signal values based on 50 Hz cycle unit of the AC power supply Vac based on the voltage signal V1. The average width determination section 1615 outputs the averaged current value as an average width signal iday. The average width signal idav is output to the positive-side and negative-side width correction sections 1616 and 1617.

The positive-side sine wave signal sfua and the average width signal idav are input into the positive-side width correction section 1616. The width correction section 1616 performs a process to add the average width signal idav to the positive-side sine wave signal sfua and outputs a result thereof as a positive-side correction signal swu. Similarly, the negative-side sine wave signal sfud and the average width signal idav are input into the negative-side width correction section 1617. The width correction section 1617 performs a process to subtract the average width signal idav from negative-side sine wave signal sfud and outputs a result thereof as a negative-side width correction signal swd. The positive-side correction signal swu and the negative-side width correction signal swd are output to the width feedback section 1618.

The positive-side correction signal swu obtained by adding the average width signal idav and the negative-side width correction signal swd that is obtained by subtracting the average width signal idav are input into the width feedback section 1618. The width feedback section 1618 adds a predetermined feedback value specified by the width feedback signal dif2 to the positive-side correction signal swu and the negative-side width correction signal swd respectively, and outputs a result thereof as the positive-side envelope signal envup and the negative-side envelope signal envdn. The positive-side and negative-side envelopes envup and envdn are output to comparators 1631 and 1632 (see FIG. 7) of the third circuit section 163. A generation method of the width feedback signal dif2 will be described later.

Figure 6:
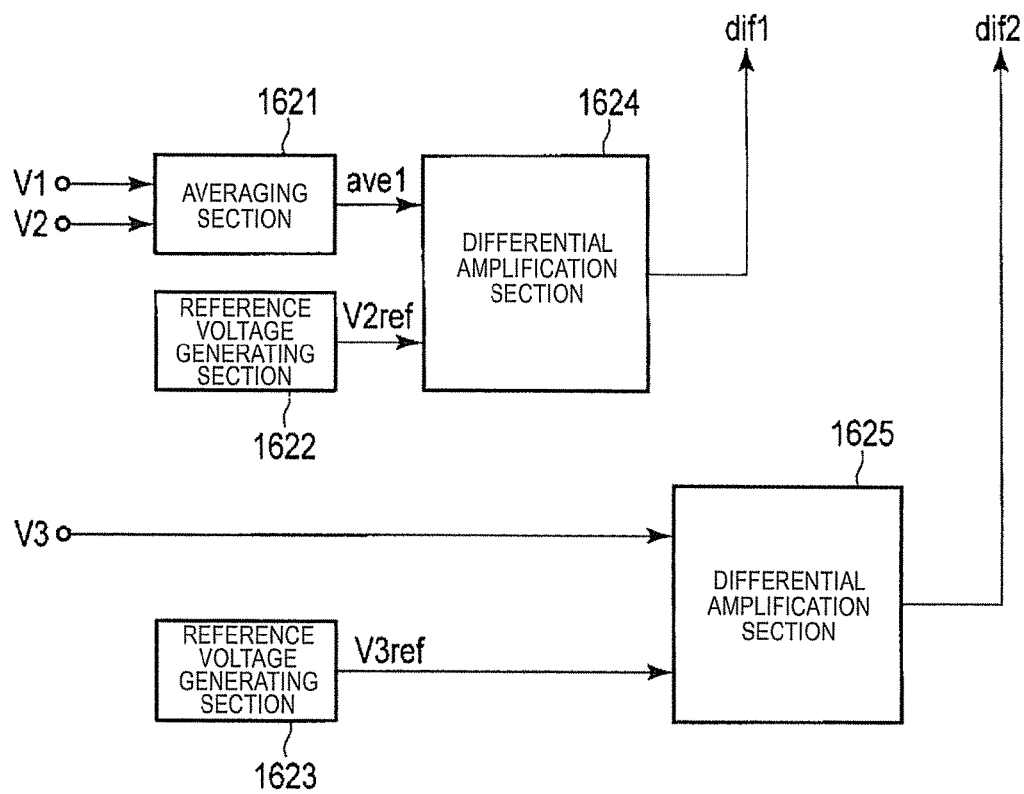
FIG. 6 is a block diagram illustrating an internal configuration of a second circuit section of FIG. 4.

FIG. 6 is a block diagram illustrating an internal configuration of the second circuit section 162. As illustrated in FIG. 6, the second circuit section 162 includes an averaging section 1621, first and second reference voltage generating sections 1622 and 1623, and first and second differential amplification sections 1624 and 1625.

The detection signal V1 and the detection signal V2 are input into the averaging section 1621. The detection signal V1 indicates the voltage and the phase of the AC power supply Vac. The detection signal V2 indicates the C2 voltage. The averaging section 1621 averages the values of the detection signal V2 for each period of the detection signal V1. The detection signal V2 outputs an averaged result as an averaging signal ave1. The averaging signal ave1 is output to the first differential amplification section 1624.

The first reference voltage generating section 1622 generates a reference voltage with respect to the C2 voltage. The generated reference voltage is output to the first differential amplification section 1624 as a reference voltage signal V2ref.

The second reference voltage generating section 1623 generates a reference voltage with respect to the output voltage. The generated reference voltage is output to the second differential amplification section 1625 as a reference voltage signal V3ref.

The averaging signal ave1 and the reference voltage signal V2ref are input into the first differential amplification section 1624. The first differential amplification section 1624 calculates a difference between the reference voltage signal V2ref and the averaging signal ave1, and outputs the difference therebetween to the amplification factor feedback section 1614 as the amplification factor feedback signal dif1. In addition, if the averaging signal ave1 is greater than the reference voltage signal V2ref, the amplification factor that is specified by the amplification factor feedback signal dif1 is reduced. Conversely, if the averaging signal ave1 is smaller than the reference voltage signal V2ref, the amplification factor specified by the amplification factor feedback signal dif1 is increased.

A detection signal V3 and the reference voltage signal V3ref are input into the second differential amplification section 1625. The detection signal V3 indicates the output voltage. The second differential amplification section 1625 calculates a difference between the reference voltage signal V3ref and the detection signal V3, and outputs the difference therebetween to the width feedback section 1618 as the width feedback signal dif2. In addition, if the detection signal V3 is greater than the reference voltage signal V3ref, the width feedback signal dif2 operates the width that is obtained by adding the positive-side correction signal swu and the negative-side width correction signal swd by the width feedback section 1618 in a direction in which the width is reduced. Conversely, if the detection signal V3 is smaller than the reference voltage signal V3ref, the width feedback signal dif2 operates the width that is obtained by adding the positive-side correction signal swu and the negative-side width correction signal swd by the width feedback section 1618 in a direction in which the width is increased.

Figure 7:
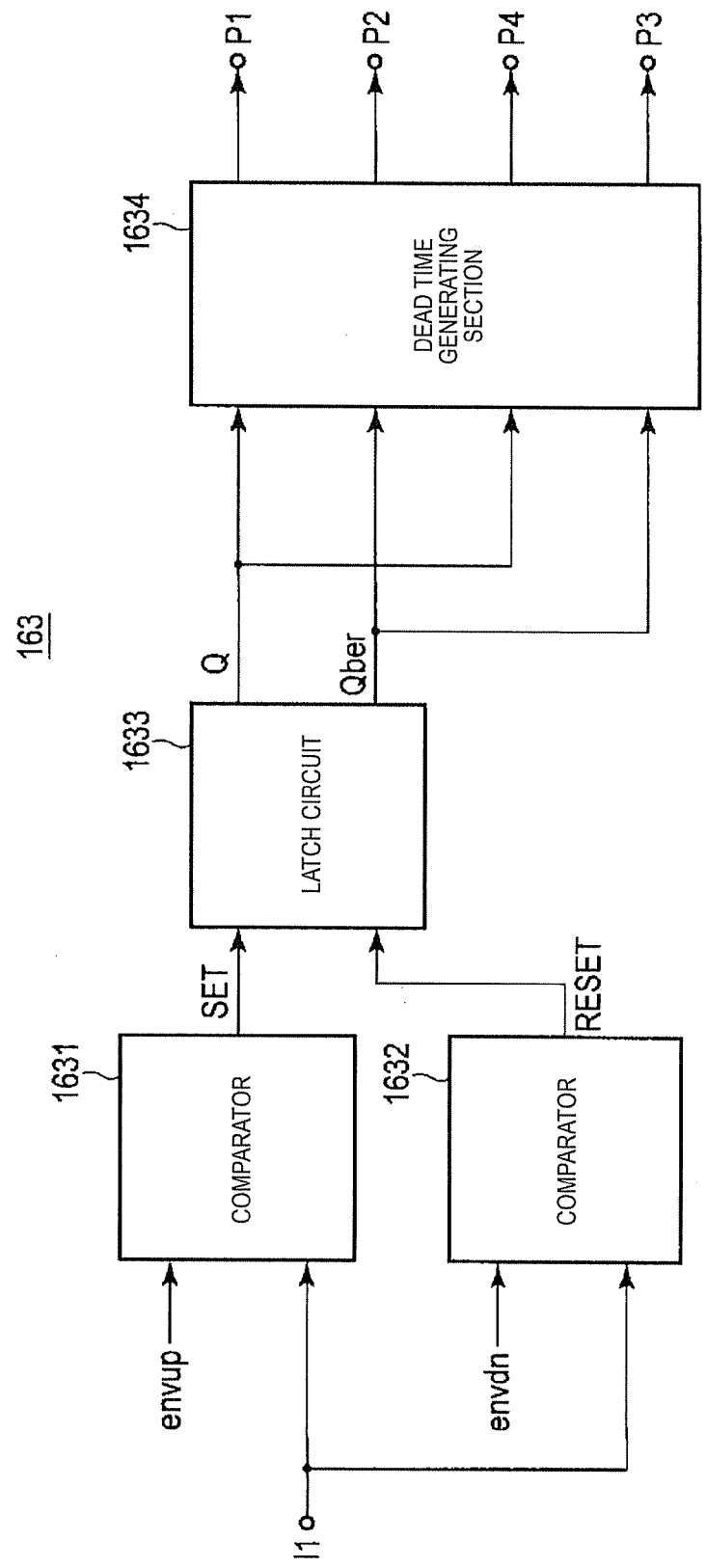
FIG. 7 is a block diagram illustrating an internal configuration of a third circuit section of FIG. 4.

FIG. 7 is a block diagram illustrating an internal configuration of the third circuit section 163. The third circuit section 163 includes first and second comparators 1631 and 1632, a latch circuit 1633, and a dead time generating section 1634.

The positive-side envelope signal envup and the detection signal I1 are input into the first comparator 1631. The detection signal I1 indicates the circuit current flowing through the second inductor L2. The first comparator 1631 compares the detection signal I1 to the envelope signal envup and if the detection signal I1 is greater than the envelope signal envup, the first comparator 1631 outputs a set signal SET to the latch circuit 1633.

The negative-side envelope signal envdn and the detection signal I1 are input into the second comparator 1632. The second comparator 1632 compares the detection signal I1 to the envelope signal envdn and if the detection signal I1 is smaller than the envelope signal envdn, the second comparator 1632 outputs a reset signal RESET to the latch circuit 1633.

The set signal SET and the reset signal RESET are input into the latch circuit 1633. The latch circuit 1633 fixes an output signal Q at a high level and an output signal Qbar at a low level when the set signal SET is input. The latch circuit 1633 fixes the output signal Q at the low level and the output signal Qbar at the high level when the reset signal RESET is input. The set signal SET and the reset signal RESET are alternately input. Thus, the output signal Q and the output signal Qbar of the latch circuit 1633 are mutually inverted and hold the state.

The output signal Q and the output signal Qbar of the latch circuit 1633 are input into the dead time generating section 1634. The dead time generating section 1634 has a predetermined delay time for rising of the output signal Q. Similarly, the dead time generating section 1634 has a predetermined delay time for rising of the output signal Qbar. However, the delay does not work for falling of the output signals Q and Qbar.

FIG. 8 is a timing chart illustrating a basic operation of the dead time generating section 1634. In FIG. 8, a horizontal axis indicates a time t and FIG. 8 indicates an enlarged switching operation of 100 kHz. Waveforms of FIG. 8 indicate the positive-side envelope signal envup (dotted line), a current value env1 (dotted line) of the AC power supply Vac, the negative-side envelope signal envdn (dotted line), the detection signal I1 (solid line) of the circuit current folding between the positive-side and negative-side envelope signals envup and envdn, the set signal SET, the reset signal RESET, the gate driving signals (pulse signals) P1 to 24 for driving the switches S1 to S4, respectively, and a voltage UV that is generated between the U terminal and the V terminal in FIG. 1 in order from the top.

For example, it is assumed that the current gate driving signals are P1=H, P2=L, P3=L, and P4=H. At this time, in the circuit of FIG. 1, the current flows from the left to the right with respect to the second inductor L2. The direction is defined as positive of the circuit current (detection signal I1) of FIG. 8.

The circuit current increases in the positive direction and then the detection signal I1 reaches the positive-side envelope signal envup. An arrival point q1 is referred to as a positive-side determination point. If the detection signal I1 reaches the positive-side envelope signal envup, the latch circuit 1633 outputs the set signal SET. If the set signal SET is output, the dead time generating section 1634 lowers the gate driving signal 21 and the gate driving signal 24 simultaneously with rising of the set signal SET. As a result, a path in a direction in which the circuit current is increased is blocked.

After the gate driving signal P1 and the gate driving signal P4 are lowered, the dead time generating section 1634 waits for an elapsed delay time td and raises the gate driving signal P2 and the gate driving signal P3 that are in an OFF state until then. The delay time td is inserted in order to prevent the gate driving signal P1 and the gate driving signal P2 or the gate driving signal P3 and the gate driving signal P4 from being simultaneously turned on, and the circuit is damaged by a short circuit.

If the gate driving signal P2 and the gate driving signal P3 rise, the circuit current turns to the decrease from the increase. Thus, since the detection signal I1 is quickly smaller than the envelope signal envup, the set signal SET quickly returns to an L level.

If the switch state is maintained, the circuit current eventually turns from the positive to the negative. Then, the detection signal I1 eventually reaches the negative-side envelope signal envdn. An arrival point q2 is referred to as a negative-side determination point. If the detection signal I1 reaches the negative-side envelope signal envdn, the latch circuit 1633 outputs the reset signal RESET. If the reset signal RESET is output, the dead time generating section 1634 lowers the gate driving signal P2 and the gate driving signal P3 simultaneously with rising of the reset signal RESET. As a result, a path in a direction in which the circuit current is decreased is blocked.

After the gate driving signal P2 and the gate driving signal P3 are lowered, the dead time generating section 1634 waits for the elapsed delay time td and raises the gate driving signal P1 and the gate driving signal P4 that are in an OFF state until then.

If the gate driving signal P1 and the gate driving signal P4 rise, the circuit current turns to the increase from the decrease. Thus, since the detection signal I1 is quickly greater than the envelope signal envdn, the reset signal RESET quickly returns to the L level.

If the switch state is maintained, the circuit current eventually turns from the negative to the positive. Then, the detection signal I1 eventually reaches the positive-side envelope signal envup. If the detection signal I1 reaches the positive-side envelope signal envup, the latch circuit 1633 outputs the set signal SET again. If the set signal SET is output, the dead time generating section 1634 lowers the gate driving signal P1 and the gate driving signal P4 simultaneously with rising of the set signal SET. Furthermore, the dead time generating section 1634 waits for the elapsed delay time td and raises the gate driving signal P2 and the gate driving signal P3.

Thereafter, the dead time generating section 1634 repeats the above operations. The circuit current reciprocates between predetermined envelopes envup and envdn by repeating operation. As a result, the circuit current performs high frequency oscillation approximately 100 kHz transferring the power to the load 2, and the average current flows through the low-pass filters L1 and C1 as the current Iac of the AC power supply Vac.

Figure 9A:
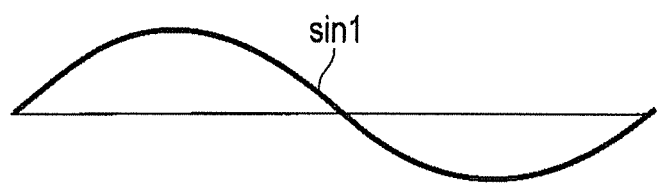
FIGS. 9A to 9D are waveform diagrams illustrating a calculation result of a function to an envelope.

Next, how the envelope waveform is generated will be described with reference to FIGS. 9A to 9D. FIG. 9A indicates the sine wave signal sin 1 that is a base. The waveform is generated in synchronization with the voltage phase of the AC power supply Vac.

Figure 9B:
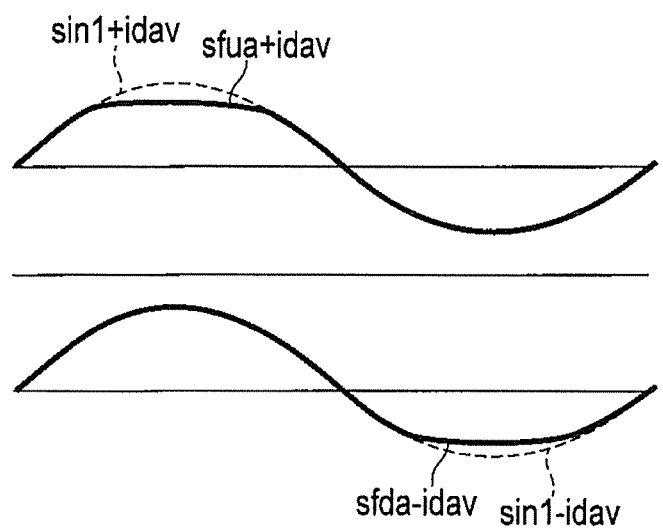

An upper portion of FIG. 9B indicates waveforms that are obtained by adding the average width signal idav output from the average width determination section 1615 to the signal sfua by the amplification factor feedback section 1614, in which amplitude adjustment of the sine wave signal sfu that is obtained by performing a predetermined function calculation with respect to the sine wave signal sin 1 that is the base by the positive-side sine wave correction section 1612 is performed. Furthermore, a lower portion of FIG. 9B indicates a waveform that is obtained by subtracting the average width signal idav output by the average width determination section 1615 from the signal sfda by the amplification factor feedback section 1614, in which amplitude adjustment of the sine wave signal sfd that is obtained by performing a predetermined function calculation with respect to the sine wave signal sin 1 that is the base by the negative-side sine wave correction section 1613 is performed. The correction is performed and the peak value of the sine wave is decreased in the vicinity of the voltage peak of the AC power supply Vac by each process of the sine wave correction, the feedback correction of the amplification factor, and the width correction.

Figure 9C:
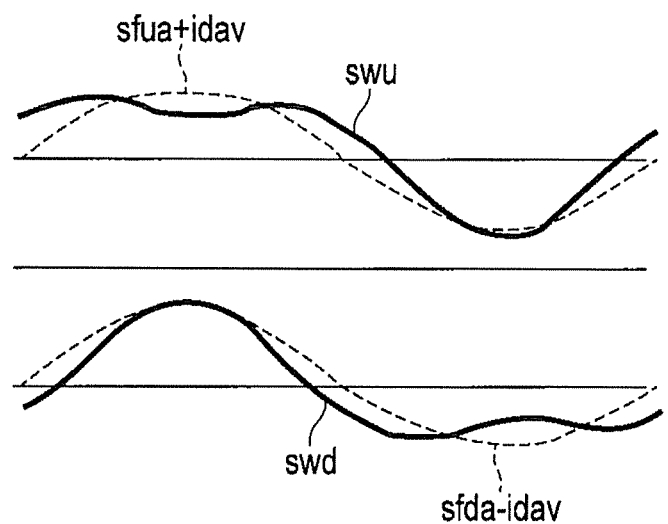

FIG. 9C indicates waveforms in which the process of the width correction is added by the positive-side width correction section 1616 and the negative-side width correction section 1617, and the width is intentionally changed within one period of the AC power supply Vac rather than a constant width. Specifically, the width is narrow in the vicinity of the peak value of the AC power supply Vac and the width is wide in the vicinity of the zero cross.

Figure 9D:
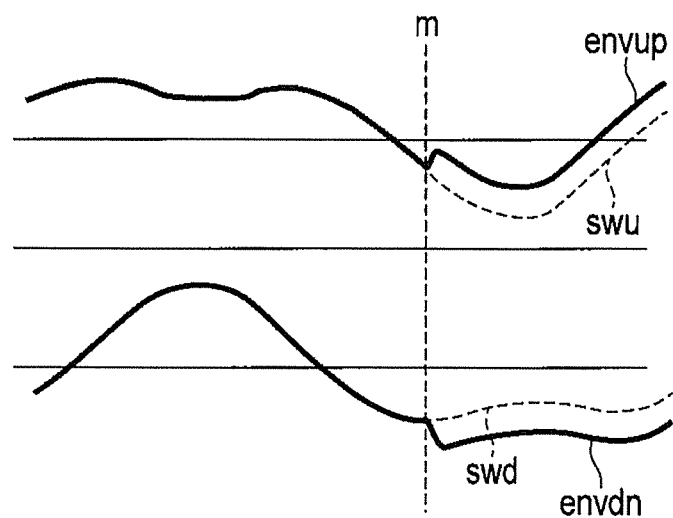

FIG. 9D indicates a result in which the width feedback correction is applied to signals swu and swd of FIG. 9C by the width feedback section 1618. It is assumed that it has changed from the light load to the heavy load at a change point m of the load 2. The change is quickly detected by the voltage detection section 15 as the decrease of the output voltage, the detection signal V3 is reflected by the width feedback section 1618, and the detection signal V3 operates in a direction in which the width is increased. As a result, the power supplied to the load 2 increases and thus the output voltage returns to an original voltage. Meanwhile, since the width is only increased or decreased even if the change occurs, the input current that is the average value maintains the sine wave.

Next, a description in which the input current waveform that is the average value becomes the sine wave by applying the function to the envelope will be given with reference to FIGS. 10A and 10B. In the envelope constituted by the simple sine wave, the fact that the input current Iac that is the average value does not become the sine wave is described with reference to FIGS. 3A and 3B. If the function is applied to the envelope, as illustrated in FIG. 10B, the input current Iac is close to the sine wave even in the situation of FIGS. 3A and 3B.

Figure 10A:
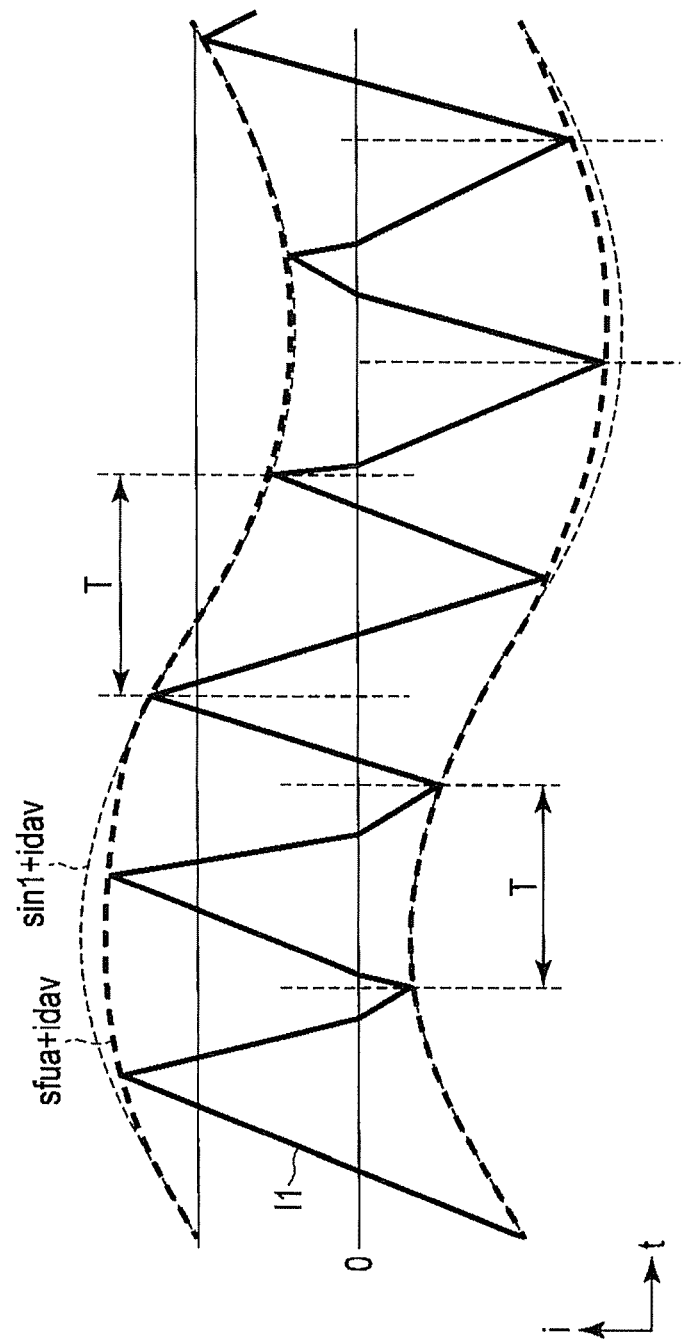

FIGS. 10A and 10B are the same waveforms as those of FIGS. 3A and 3B, a horizontal axis indicates the time t, and a vertical axis indicates the current value i. The time t indicates one period of the AC power supply Vac of 50 Hz.

FIG. 10A indicates a waveform sin 1+idav (fine dotted line) having a width to the sine wave, an envelope sfua+idav (dotted line) in which the function is performed such that a value is reduced in the vicinity of the peak with respect to the waveform sin 1+idav, and the detection signal I1 (solid line) of the circuit current folding inside the envelope sfua+iday.

In the example of FIGS. 3A and 3B, since the slope of the current is changed in the vicinity of the current zero point 0, it takes time to reach the envelope in the vicinity of the voltage peak of the AC power supply Vac. Thus, the frequency of the circuit current is reduced. Thus, in the example of FIG. 10A, the function is applied to the envelope and the folding time is not applied more than expected considering the change of the slope of the current. Thus, a phenomenon that the frequency of the circuit current is reduced is alleviated.

As illustrated in FIG. 10B, if one period of a 100 kHz operation of a trace of the circuit current is considered, when a positive-side current area is SH1 and a negative-side current area is SH2, SH1−SH2 is a current value of subtraction and a value that is obtained by averaging the current value in one period of the 100 kHz operation is a point E. The sine wave correction sections 1612 and 1613 may be multiplied by a correction function to the envelope such that the point E rides the sinusoidal current to be a target.

The correction function is arbitrarily, but, for example, if the vicinity of the peak is suppressed, a quadratic function as the following Expression (1) may be applied. In Expression (1), k is a coefficient and, for example, is a positive value of a range of 1 to 10.

$$y = \sin(x) - (\sin(x))2/k \quad (1)$$

Next, a method for intentionally changing an output current of the rectification smoothing circuit will be described with reference to FIGS. 11A and 11B. Similar to FIGS. 10A and 10B, also in FIGS. 11A and 11B, a horizontal axis indicates the time t and a vertical axis is the current value i. In an example of FIG. 11A, a width in one cycle of the AC power supply Vac is not constant and the width is variable depending on the phase. Specifically, a width H1 is narrow in the vicinity of the voltage peak of the AC power supply Vac and a width H2 is wide in the vicinity of the zero cross.

As described above, the frequency of the circuit current is intentionally raised in the vicinity of the voltage peak and the frequency of the circuit current is reduced in the vicinity of the zero cross by varying the width. As a result, if the frequency in characteristics of the transformer T1, that is, in insulation electricity transmission, is high, the power is hardly transmitted on the output side and if the frequency is low, the power is easily transmitted on the output side and the output current is substantially uniformly flows regardless of the phase of the AC power supply Vac.

At this time, as illustrated in the waveform of FIG. 11B, since the operation is the increase and decrease of the width, and a current area is uniformly increased and decreased, the average current is not affected. Thus, the current Iac flowing through the AC power supply Vac can maintain the sine wave even if the width correction function is applied by the width correction sections 1616 and 1617.

Figure 12A:
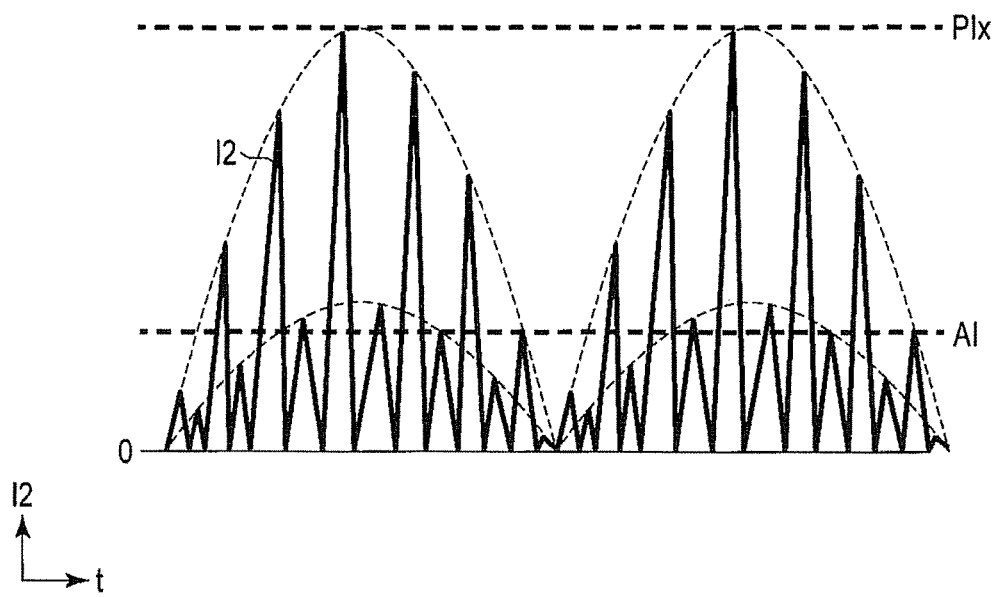
FIGS. 12A and 12B are waveform diagrams illustrating a secondary-side current of a transformer.
Figure 12B:
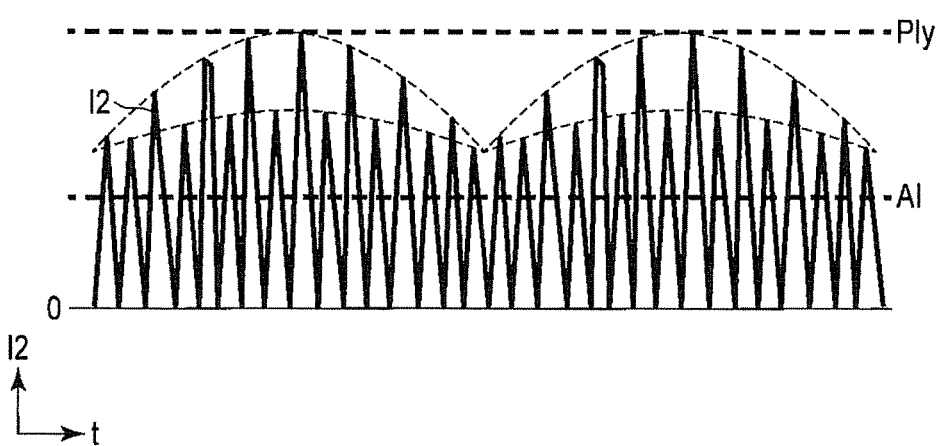

An appearance in which the output current of the rectification smoothing circuit is uniform will be described with reference to FIGS. 12A and 12B. In FIGS. 12A and 12B, a horizontal axis is the time t and indicates one period of 50 Hz of the AC power supply Vac. A vertical axis indicates the diode current I2. Furthermore, current values Pix and PIy indicate peak currents and a current value AI indicates an average current.

FIG. 12A illustrates the waveform of the diode current I2 when the envelope illustrated in FIGS. 10A and 10B is applied. In a case of the control by the envelope illustrated in FIGS. 10A and 10B, the current flowing through the diode in the vicinity of the zero point is decreased and is increased in the vicinity of the peak. That is, for example, a repetitive operation is performed in which after the current flows through the diode D1, the current flows through the diode D2, and then the current flows through the diode D1 again. At this time, there is a large difference between the current flowing through the diode D1 and the current flowing through the diode D2, and as a result, a peak current PIx is increased with respect to the average current AI.

Figure 11A:
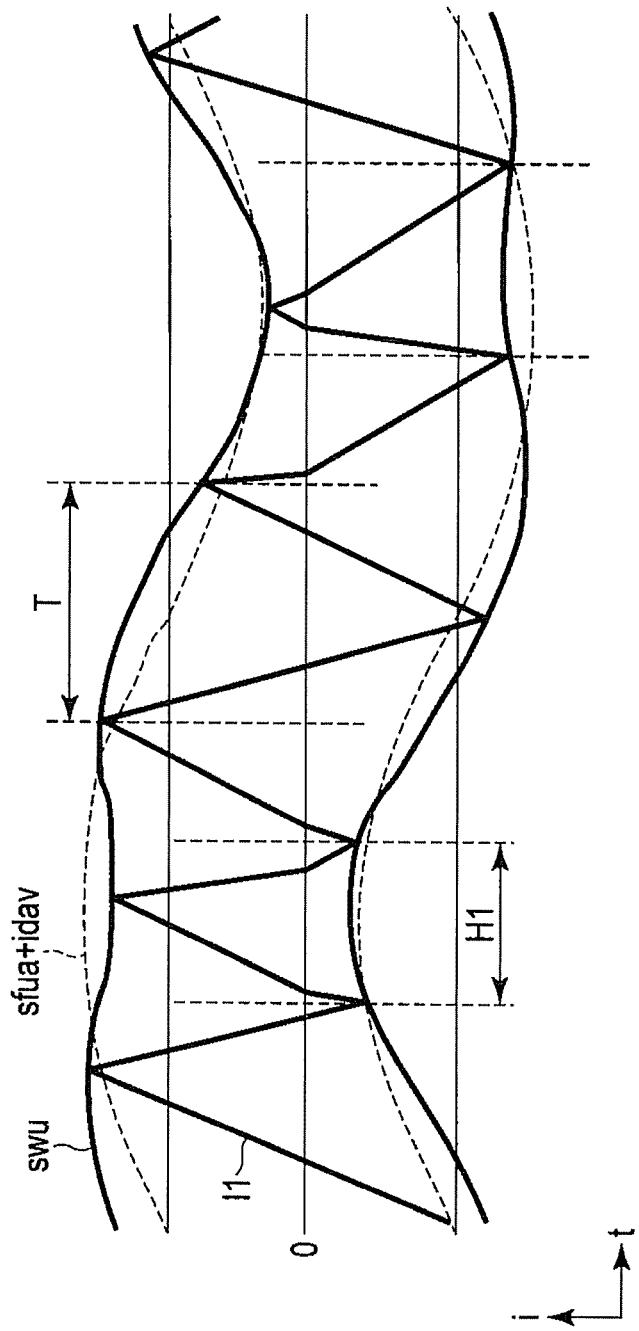

FIG. 12B illustrates the waveform of the diode current I2 when the envelope illustrated in FIGS. 11A and 11B is applied. In a case of the control by the envelope illustrated in FIGS. 11A and 11B, the current flowing through the diode in the vicinity of the zero point is secured. As a result, it is possible to suppress the peak current PIy to be low. That is, in order to make the current be equal to the average current AI, the current is increased in the vicinity of the zero point and the peak current is suppressed.

A power loss due to flowing of the current is $W=I^2R$. That is, if the current increases, the power loss increases with the square thereof. Thus, in order to reduce the power loss by applying the envelope illustrated in FIGS. 11A and 11B, it is effective to suppress the peak current to be small with respect to the average current.

As described above, according to the embodiment, since the current of the same phase as that of the input voltage can flow through the AC power supply Vac by relatively simple control, it is possible to greatly reduce the high frequency of the input current. As a result, an adverse effect such as burning is not given to transforming equipment or a breaker that is an external connection of the AC power supply Vac. Furthermore, since the peak of the current flowing through the inside the circuit is suppressed, it is possible to realize the power conversion apparatus with a high efficiency, small size, and low cost by an operation of small power loss.

Second Embodiment

Next, a second embodiment will be described. Moreover, the same reference numerals are given to the common portions of the first embodiment and detailed description thereof will be omitted.

Figure 13:
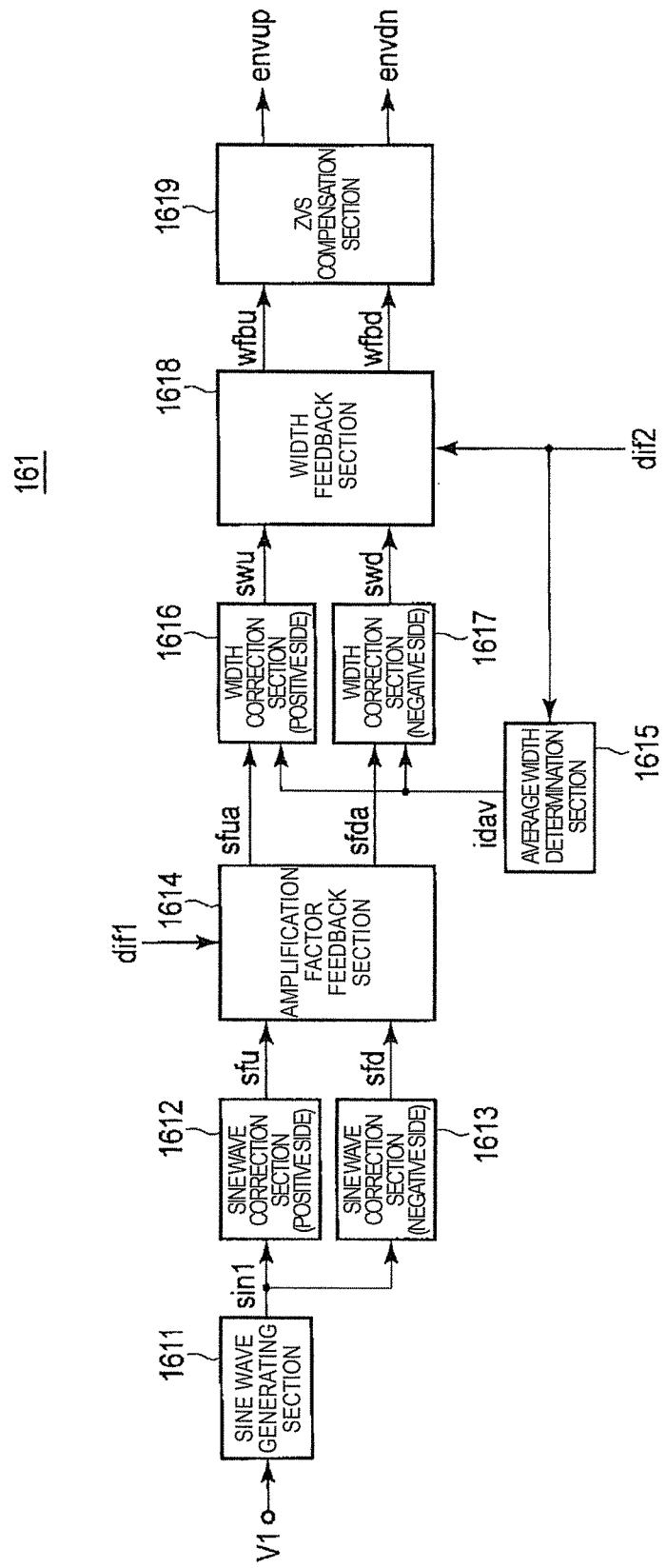
FIG. 13 is a block diagram illustrating an internal configuration of a first circuit section of a second embodiment.
Figure 14:
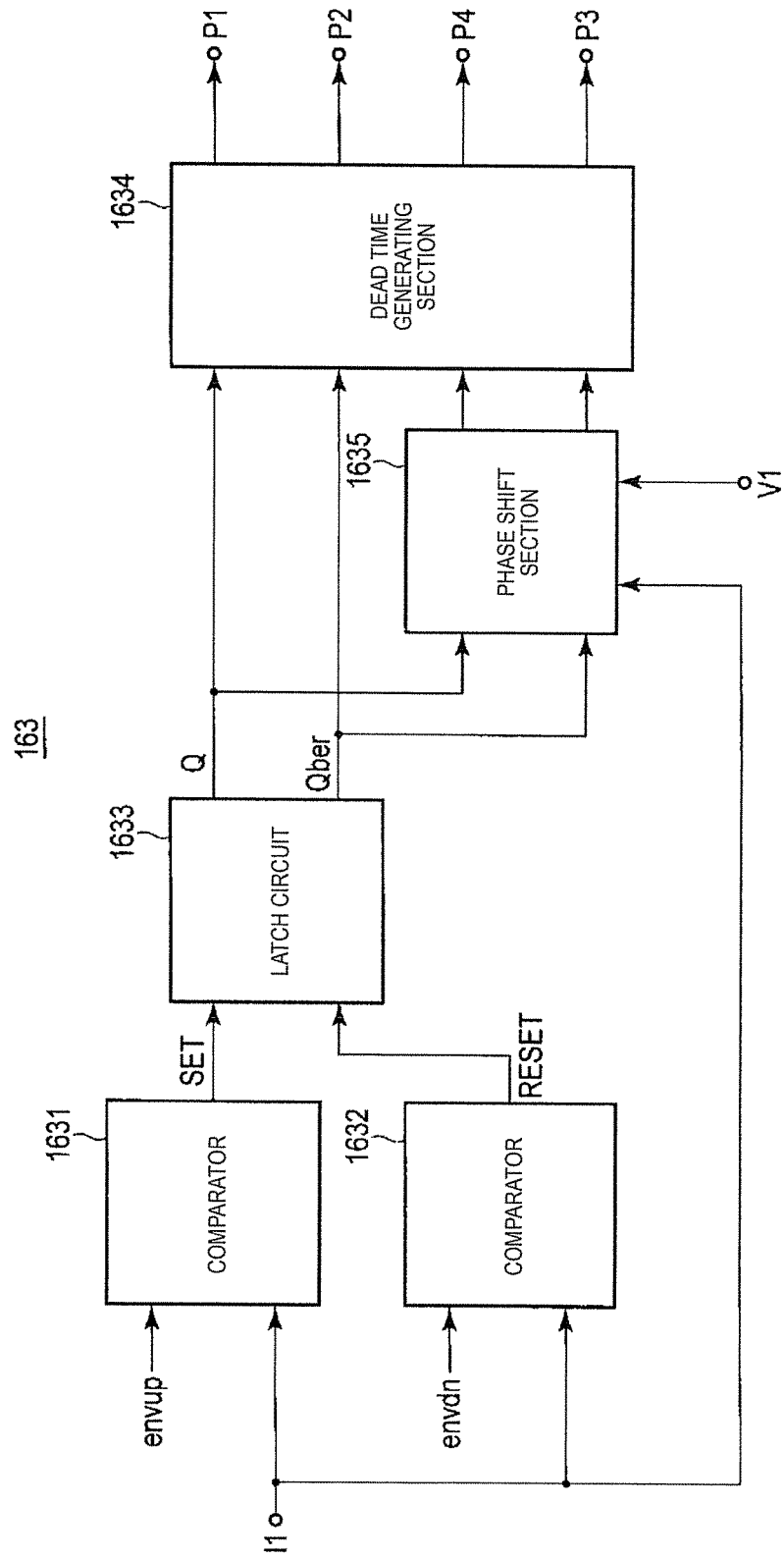
FIG. 14 is a block diagram illustrating an internal configuration of a third circuit section of the second embodiment.

A portion where the second embodiment differs from the first embodiment is a part of the configuration of the first circuit section 161 and the third circuit section 163 of the control section 16. An internal configuration of the first circuit section 161 is illustrated in FIG. 13 and an internal configuration of the third circuit section 163 is illustrated in FIG. 14. As it can be seen by respectively comparing FIG. 13 and FIG. 5, and FIG. 14 and FIG. 7, in the second embodiment, a ZVS compensation section 1619 is added to the first circuit section 161 and a phase shift section 1635 is added to the third circuit section 163. Furthermore, in the first circuit section 161, the width feedback signal dif2 is input into the average width determination section 1615.

In the first embodiment, the average width determination section 1615 determines the average width by averaging the detection signal I2 of the diode current based on 50 Hz period unit of the AC power supply Vac based on the voltage signal V1. However, the determination method of the average width is not limited to the above method.

In the second embodiment, the width feedback signal dif2, that is, a difference value between the detection signal V3 of the output voltage and the reference voltage signal V3ref, is input into the average width determination section 1615, and the average width determination section 1615 integrates and averages the difference values to determine the average width. The average width signal idav corresponding to the average width is output to the positive-side and negative-side width correction sections 1616 and 1617. As described above, as a unit for averaging, a time integral may be used rather than a period unit of the AC power supply Vac.

In the first embodiment, the positive and negative signals output from the width feedback section 1618 are output to the first and second comparators 1631 and 1632 as the positive-side envelope signal envup and the negative-side envelope signal envdn. However, a Zero Voltage Switching (ZVS) compensation function may be input so as to always satisfy a ZVS condition with respect to four switches configuring a bridge. It is possible to realize switching in which power loss is small by inputting the ZVS compensation function.

The ZVS compensation section 1619 is a section for realizing the ZVS compensation function. A positive-side processing signal wfbu and a negative-side processing signal wfbd output from the width feedback section 1618 are input into the ZVS compensation section 1619. In the first embodiment, the positive-side processing signal wfbu is equal to the positive-side envelope signal envup and the negative-side processing signal wfbd is equal to the negative-side envelope signal envdn.

The ZVS compensation section 1619 detects that the positive-side processing signal wfbu is in a positive region. Then, if it is detected that the processing signal wfbu is out of the positive region, the ZVS compensation section 1619 invalidates a negative value included in the processing signal wfbu and re-sets the invalidated value to zero or a positive value. Similarly, the ZVS compensation section 1619 detects that the negative-side processing signal wfbd is in the negative region. Then, if it is detected that the processing signal wfbd is out of the negative region, the ZVS compensation section 1619 invalidates the positive value included in the processing signal wfbd and re-sets the invalidated value to zero or the negative value.

As described above, the ZVS compensation section 1619 has a margin and outputs the margin as the positive-side envelope signal envup such that the positive-side processing signal wfbu always has the positive value. Furthermore, the ZVS compensation section 1619 has the margin and outputs the negative-side envelope signal envdn such that the negative-side processing signal wfbd always has the negative value.

The output signal Q and the output signal Qber of the latch circuit 1633 are input into the phase shift section 1635. The phase shift section 1635 shifts the phase of the output signal Q and the output signal Qber. A phase shift amount is determined from the circuit current obtained from the detection signal I1 and the input voltage obtained from the detection signal V1. The phase shift section 1635 outputs the output signal Q and the output signal Qber in which the phase is shifted to the dead time generating section 1634.

In the dead time generating section 1634, output timing of switch driving signals P3 and P4 with respect to the switch S3 and the switch S4 are delayed more than switch driving signals P1 and P2 by the phase shift with respect to the switch S1 and the second switch S2 by a time of the phase shift amount. That is, the switching operation on the V terminal side is delayed more than the switching operation on the U terminal side configuring the bridge by a predetermined time. A period through which a constant current flows is added at a folding point of the circuit current by the delay without an immediately inverted slope of the current. As a result, since a sharp change, that is, the high frequency component contained in the current component, is reduced, a measure against noise becomes easy.

Furthermore, as another effect, the circuit scheme of FIG. 1 performs control so as to be narrower the width to reduce the output in the light load. When such a control is applied, since the circuit current reciprocates between narrow envelopes, as a result, the frequency of the switching operation is high. Specifically, the 100 kHz operation is performed in the heavy load but the operation is increased to 150 kHz in the light load.

Thus, as described above, it is possible to suppress the increase of frequency by inserting the phase shift section 1635. Specifically, the phase shift section 1635 determines that it is the light load from the detection signal I1 of the circuit current. Then when it is the light load, the phase shift section 1635 increases the phase shift amount depending on the decrease in the circuit current I1. Otherwise, there is also a method in which the phase shift section 1635 determines the phase shift amount such that the frequency is not increased in the vicinity of the voltage zero cross of the AC power supply Vac. Specifically, it is possible to realize that the voltage phase is indexed from the voltage signal V1 of the AC power supply Vac and the phase delay amount is increased in the vicinity of zero degree or 180 degrees of the phase angle.

Figure 15:
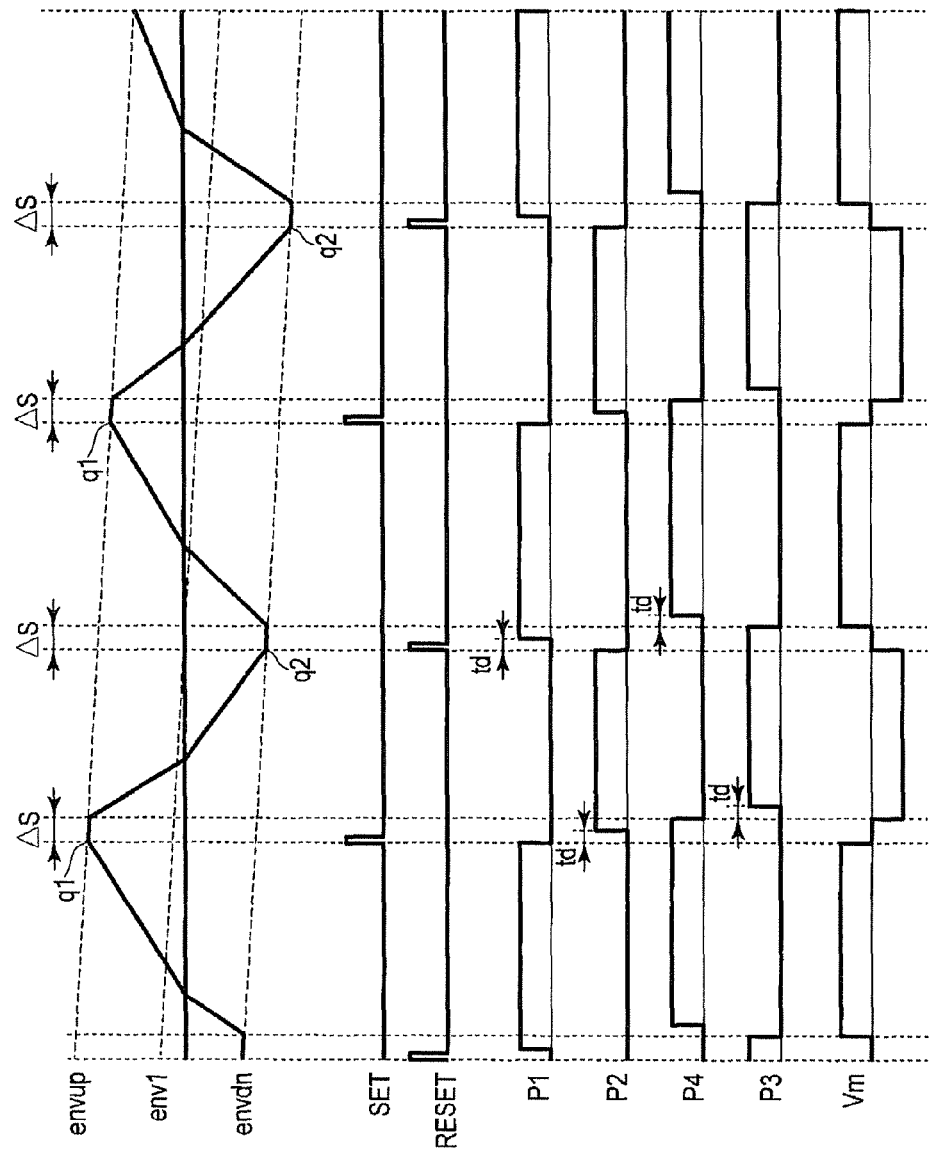
FIG. 15 is a waveform diagram illustrating a main circuit operation of a control section of the second embodiment.

An operation of the second embodiment will be described with reference to a waveform view of FIG. 15. Similar to FIG. 8, in FIG. 15, a horizontal axis indicates the time t and FIG. 15 indicates an enlarged switching operation of 100 kHz. Waveforms of FIG. 15 indicate the positive-side envelope signal envup (dotted line), a current value env1 (dotted line) of the AC power supply Vac, the negative-side envelope signal envdn (dotted line), the detection signal I1 (solid line) of the circuit current folding between the positive-side and negative-side envelope signals envup and envdn, the set signal SET, the reset signal RESET, the gate driving signals (pulse signals) P1 to P4 for driving the switches S1 to S4 respectively, and a voltage UV that is generated between the U terminal and the V terminal in FIG. 1 in order from the top.

For example, it is assumed that the current gate driving signals are P1=H, P2=L, P3=L, and P4=H. In this case, the circuit current increases in the positive direction and then the detection signal I1 reaches the positive-side envelope signal envup. If the detection signal I1 reaches the positive-side envelope signal envup, the latch circuit 1633 outputs the set signal SET. If the set signal SET is output, the dead time generating section 1634 lowers the gate driving signal P1 simultaneously with rising of the set signal SET. However, the dead time generating section 1634 does not simultaneously raise the gate driving signal P4. The dead time generating section 1634 lowers the gate driving signal P4 by delaying the gate driving signal P4 by a phase shift amount ΔS. Thus, timing when the circuit current drops to the right by the phase shift amount ΔS is delayed.

After the gate driving signal P1 is lowered, the dead time generating section 1634 waits for the elapsed delay time td and raises the gate driving signal P2. Furthermore, the gate driving signal P3 is raised by delaying the gate driving signal P3 by the phase shift amount ΔS. If the gate driving signal P2 and the gate driving signal P3 rise, the circuit current turns to the decrease from the increase. Thus, since the detection signal I1 is quickly smaller than the envelope signal envup, the set signal SET quickly returns to the L level.

If the switch state is maintained, the circuit current eventually turns from the positive to the negative. Then, the detection signal I1 eventually reaches the negative-side envelope signal envdn. An arrival point q2 is referred to as a negative-side determination point. If the detection signal I1 reaches the negative-side envelope signal envdn, the latch circuit 1633 outputs the reset signal RESET. If the reset signal RESET is output, the dead time generating section 1634 lowers the gate driving signal P2 simultaneously with rising of the reset signal RESET. Furthermore, the gate driving signal P3 is lowered by delaying the gate driving signal P3 by the phase shift amount. Thus, also in the negative side, the slope of the circuit current is inverted to the positive and the delay is generated by the phase shift amount.

At this time, the voltage generated between the U terminal and the V terminal is different from the case of FIG. 8. In the example of FIG. 8, the UV value takes only a binary value of the positive value or the negative value. Meanwhile, in the example of FIG. 15, a interval in which the UV value becomes zero appears depending on the phase shift amount. As a result, the voltage applied to the bridge is reduced apparently by the phase shift amount. That is, the output is reduced even though the frequency is not changed. In other words, in the case of the light load, it is possible to supply small power without raising the frequency.

Figure 16A:
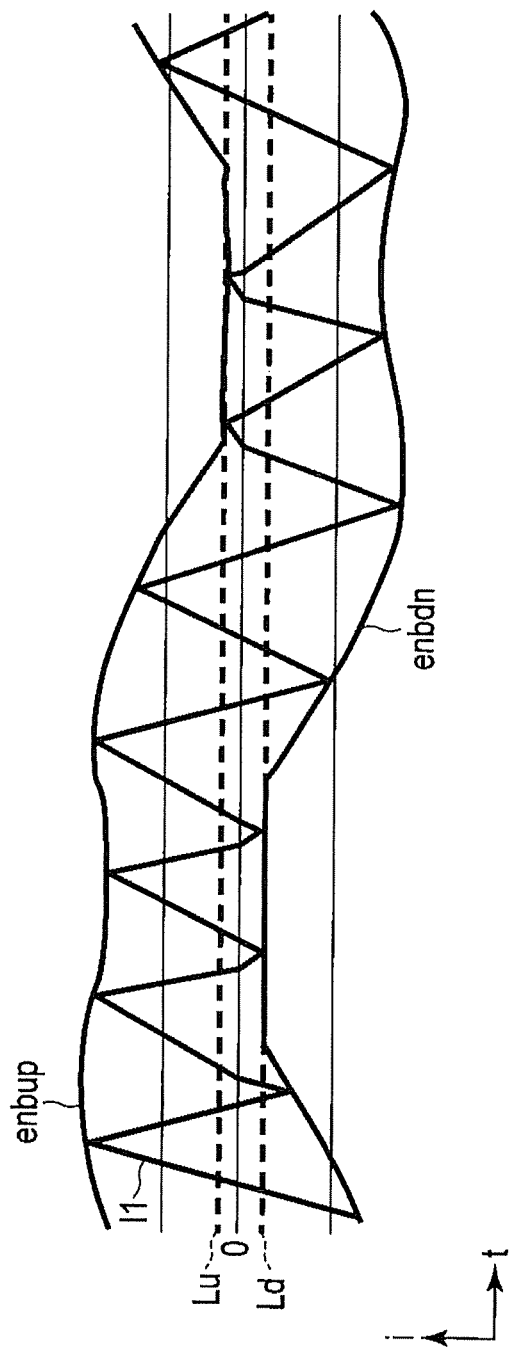

FIGS. 16A and 16B are waveform views illustrating a function of the ZVS compensation section 1619. An operation thereof is basically the same as that of FIGS. 11A and 11B, but the operation has a width narrower than that of the example of FIGS. 11A and 11B. As illustrated in FIG. 16A, if the value becomes an inside value more than ZVS compensation regions Lu to Ld, the ZVS compensation section 1619 forcibly changes the value in boundaries of the ZVS compensation regions Lu to Ld. Thus, the circuit current alternately takes the positive value and the negative value without exception.

FIG. 16B illustrates a waveform of the current signal Iac of the AC power supply Vac by the envelope in which the ZVS compensation is performed. If the envelope is applied to the region of the ZVS compensation, the waveform of the current Iac slightly deviates from the sine wave. Specifically, the current value is smaller than an original value in the vicinity of the peak where the ZVS compensation is applied. Thus, some current harmonic is generated. However, in practical use, the level has no problem at all.

Moreover, in FIGS. 16A and 16B, in order for simplify the description, the waveform is described as the phase shift amount=0. Of course, it goes without saying that the ZVS compensation operation is satisfied even if the phase shift amount is added.

According to the second embodiment, the operation of the switches configuring the bridge is always a very low state of loss by the ZVS compensation section 1619. Thus, it is possible to provide the power conversion apparatus 1 that is excellent in the power conversion efficiency. Furthermore, it is a combination of a simple circuit and simple control, and it is possible to achieve the small size and light weight of the apparatus.

Furthermore, since an effect of relieving an abrupt change is obtained by the phase shift section 1635 at the peak of the circuit current, it is possible to reduce the high frequency noise that is originated from the circuit current. That is, it is possible to reduce the size and cost of measuring components required for removing the high frequency noise.

Otherwise, since the circuit current can be reduced depending on the shift amount, it is possible to suppress the rising of the switching frequency in the light load. Switching loss is proportional to the number of switching times in the bridge, the rising of the frequency leads to an increase in the switching loss. That is, it is possible to reduce the increase in the switching loss by using the phase shift section 1635. Thus, it is possible to realize a highly efficient power conversion even in the light load.

It goes without saying that the second embodiment includes the operational effects of the first embodiment. Moreover, in the embodiments, the unit configured to change the amplification factor or the width is described using the function, but the unit is not limited to the function and, for example, a numeric value table may be used instead of the function. Furthermore, the sine wave generated in the control block is not necessarily required and, for example, the waveform of the sine wave of the input voltage may be used as it is.

Furthermore, it is possible to flow the AC current having small input current harmonic through the commercial power supply Vac by a plurality of embodiments alone or by cooperating the plurality of embodiments even though it is a simple structure. It is possible to always operate the FETs (S1 to S4) that are the switching elements at an operation mode having very low loss. Furthermore, it is possible to realize highly efficient power conversion in a state of considering variation of the load in addition to a case of a constant load by combining the second embodiment. Furthermore, also in the light load, the rising of the switching frequency is suppressed and the power conversion efficiency is prevented from being decreased. Furthermore, the operation reducing the high frequency noise due to the circuit current also leads to reduce the cost of noise measuring components. With such characteristic, a small size, high efficiency, and low cost power conversion apparatus can be configured, and the power conversion apparatus can be used as a power supply for apparatus in various field, and therefore its industrial utility is high.

Moreover, in the embodiments, the unit configured to change the amplification factor or the width is described using the function, but the unit is not limited thereto and, for example, the numeric value table may be used instead of the function. Furthermore, the sine wave generation section 1611 is not necessarily required and, for example, the waveform of the sine wave of the input voltage may be used as it is.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A power conversion apparatus comprising:
a power conversion circuit that forms a closed loop by connecting a first inductor and a first capacitor to both ends of an AC power supply in series, forms a closed loop by connecting a first switch and a second switch in series, connecting a third switch and a fourth switch in series, and respectively connecting the first switch and the third switch, and the second switch and the fourth switch, connects a series circuit consisting of the first capacitor, a second inductor different from the first inductor, and a primary winding of a transformer between a connection point of the first switch and the second switch, and a connection point of the third switch and the fourth switch, connects a second capacitor different from the first capacitor between a connection point of the first switch and the third switch, and a connection point of the second switch and the fourth switch, includes a rectification smoothing circuit in a secondary winding of the transformer, and connects a load to an output of the rectification smoothing circuit; and a control unit configured to supply a gate driving signal for alternately opening and closing a set of the first switch and the fourth switch, and a set of the second switch and the third switch to a set of the first switch and the fourth switch, and a set of the second switch and the third switch such that a current in which a high frequency component is mixed into a low frequency component of the AC power supply flows through the power conversion circuit and a frequency of the high frequency component is modulated in synchronization with a phase of the low frequency component of the AC power supply based on a power supply voltage that is obtained by a detection unit configured to detect the voltage of the AC power supply, a circuit current that is obtained by a detection unit configured to detect the circuit current flowing through the power conversion circuit, and a capacitor voltage obtained by a detection unit configured to detect a voltage of the second capacitor.

2. The apparatus according to claim 1, wherein the control unit includes a sine wave generating unit configured to generate a sine wave having the same phase as that of the power supply voltage from a signal detecting the voltage of the AC power supply, a determination unit configured to determine a target value of a current flowing through the AC power supply based on the sine wave generated by the sine wave generating unit, an envelope generating unit configured to generate an envelope on a positive side and a negative side in which a width is added after correction is performed in the sine wave so as to be the target value in which the current flowing through the AC power supply is determined by the determination unit, a detection unit configured to detect timing when the circuit current deviates from a range of the positive side envelope and the negative side envelope, and a pulse generating unit configured to generate the gate driving signal at the timing when the circuit current deviates from the range of the positive side envelope and the negative side envelope.

3. The apparatus according to claim 2, wherein the control unit further includes a width adjustment unit configured to increase and decrease the width adding to the corrected sine wave depending on a phase angle of the signal detecting the voltage of the AC power supply.

4. The apparatus according to claim 2, wherein the control unit further includes a positive side detection unit configured to detect the positive side envelope is in a positive region, a positive side envelope correction unit configured to invalidate a negative value included in the positive side envelope and re-set the invalidated value to zero or a positive value if the positive side detection unit detects that the positive side envelope is out of the positive region, a negative side detection unit configured to detect the negative side envelope is in a negative region, and a negative side envelope correction unit configured to invalidate a positive value included in the negative side envelope and re-set the invalidated value to zero or a negative value if the negative side detection unit detects that the negative side envelope is out of the negative region.

5. The apparatus according to claims 2, wherein the control unit further includes a phase shift unit configured to delay a switching operation of the set of the third switch and the fourth switch by a predetermined time or a predetermined phase with respect to a switching operation timing of the set of the first switch and the second switch.

* * * * *